(12) United States Patent
Solis et al.

(10) Patent No.: US 10,947,134 B2
(45) Date of Patent: Mar. 16, 2021

(54) HYDROGEN GENERATOR

(71) Applicants: Osvaldo Gaona Solis, Monterrey (MX); Genaro Garza de Leon, Monterrey (MX); Jorge Ivan Garza de Leon, Monterrey (MX)

(72) Inventors: Osvaldo Gaona Solis, Monterrey (MX); Genaro Garza de Leon, Monterrey (MX); Jorge Ivan Garza de Leon, Monterrey (MX)

(*) Notice: Subject to any disclaimer, the term of this patent is extended or adjusted under 35 U.S.C. 154(b) by 166 days.

(21) Appl. No.: 16/118,265

(22) Filed: Aug. 30, 2018

(65) Prior Publication Data

US 2020/0071202 A1 Mar. 5, 2020

(51) Int. Cl.
| | |
|---|---|
| *C02F 1/461* | (2006.01) |
| *C25B 1/06* | (2006.01) |
| *C25B 9/06* | (2006.01) |
| *B01J 23/04* | (2006.01) |
| *C25B 1/10* | (2006.01) |

(52) U.S. Cl.
CPC ........... *C02F 1/46109* (2013.01); *B01J 23/04* (2013.01); *C25B 1/06* (2013.01); *C25B 1/10* (2013.01); *C25B 9/06* (2013.01); *C02F 2001/46152* (2013.01)

(58) Field of Classification Search
CPC ..................................... C25B 1/06; C25B 9/06
See application file for complete search history.

(56) References Cited

U.S. PATENT DOCUMENTS

| | | | |
|---|---|---|---|
| 4,210,511 A | 7/1980 | Campbell et al. | |
| 6,866,757 B2 | 3/2005 | Gilmore | |
| 8,147,661 B2 | 4/2012 | Moon et al. | |
| 8,894,829 B2 | 11/2014 | Haryu et al. | |
| 2006/0180101 A1 | 8/2006 | Monette | |
| 2011/0089029 A1* | 4/2011 | Volk, Jr. | C25B 1/06 204/276 |
| 2011/0127160 A1 | 6/2011 | Hwang | |
| 2013/0220240 A1* | 8/2013 | Jonson | F02B 43/00 123/3 |
| 2017/0067170 A1* | 3/2017 | Hansen | C25B 9/02 |

FOREIGN PATENT DOCUMENTS

FR 3 040 397 3/2017

OTHER PUBLICATIONS

International Search Report and Written Opinion, dated May 5, 2020, received in International Patent Application No. PCT/IB19/57170.

* cited by examiner

*Primary Examiner* — Salil Jain
(74) *Attorney, Agent, or Firm* — Davis Wright Tremaine LLP; Heather M. Colburn

(57) ABSTRACT

A hydrogen generator including a series of plates positioned in an electrolysis chamber. The plates are configured to generate hydrogen. The chamber has a water inlet configured to receive water from a water source and a hydrogen outlet configured to allow the hydrogen to exit therefrom. The plates include a positive plate, a negative plate, and a neutral plate. Each of the plates has through-holes configured to allow the water and the hydrogen to flow therethrough. The positive and negative plates are configured to be connected to positive and negative terminals, respectively, of an electrical power source. The water inside the chamber forms an electrical connection between the positive and negative plates that splits the water into the hydrogen and oxygen.

75 Claims, 26 Drawing Sheets

US 10,947,134 B2

1

HYDROGEN GENERATOR

BACKGROUND OF THE INVENTION

Field of the Invention

The present invention is directed generally to devices configured to generate hydrogen gas and, more particularly, to devices that generate hydrogen gas by performing electrolysis on water.

Description of the Related Art

Hydrogen is considered a clean energy source. Unfortunately, many current methods of generating hydrogen for use as a fuel source have not been cost effective. Further, many current methods of generating hydrogen are not capable of generating a sufficient amount of hydrogen at a desired rate.

BRIEF DESCRIPTION OF THE SEVERAL VIEWS OF THE DRAWING(S)

2

Figure 16:
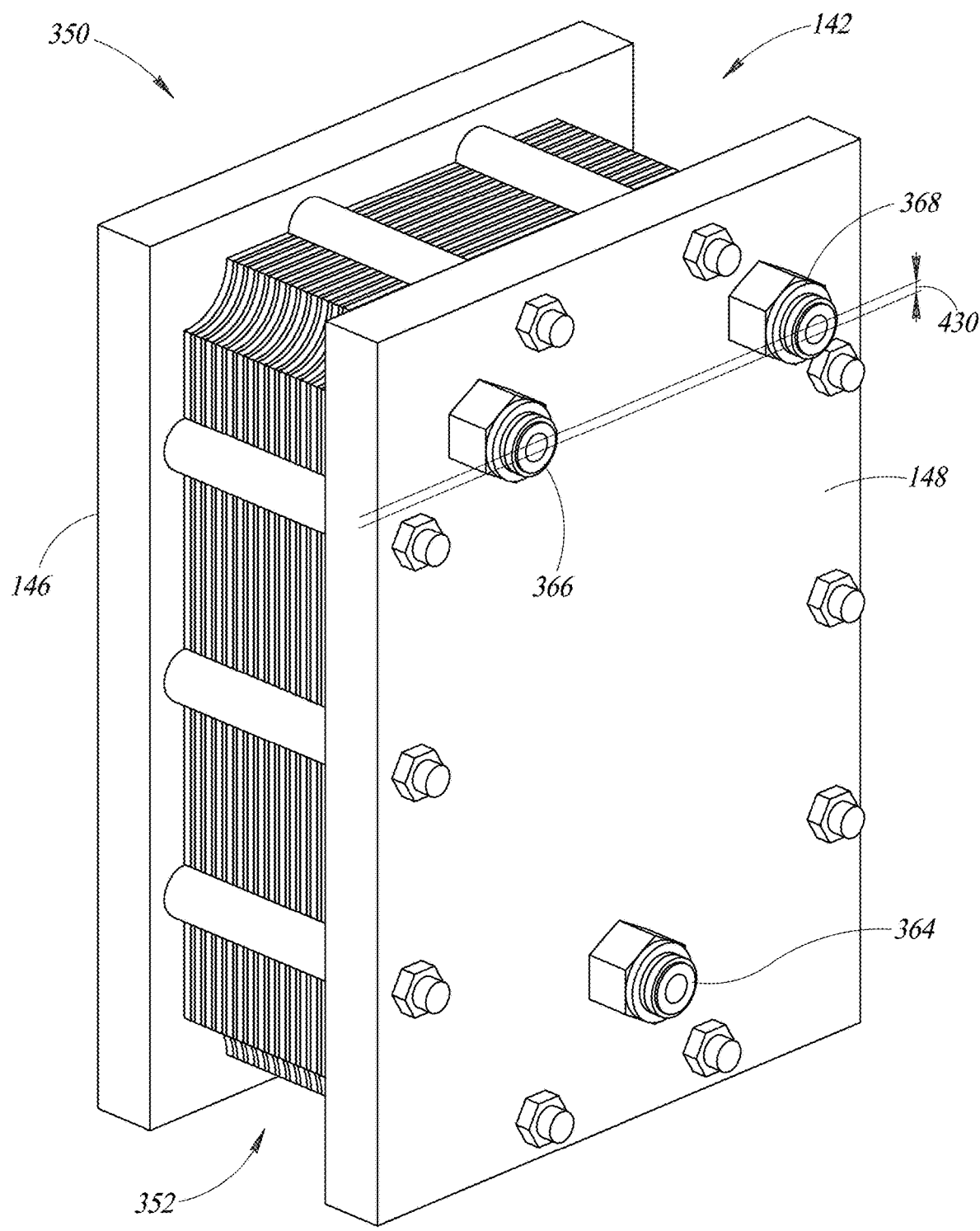
FIG. 16 is a perspective view of a second embodiment of the hydrogen generator configured to low-density applications.
Figure 19:
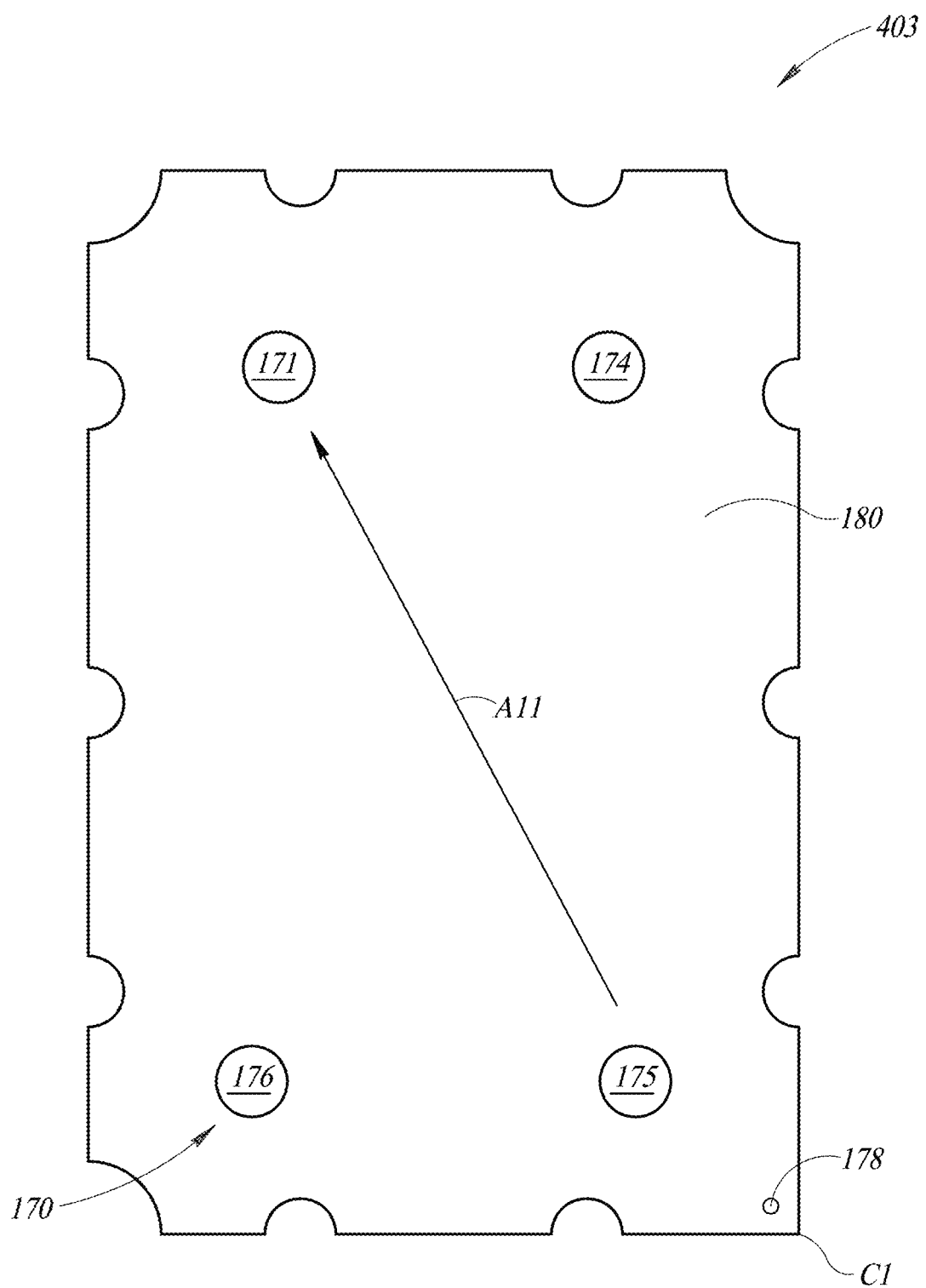

FIG. 19 is a view of a first side of a first neutral plate of the hydrogen generator of FIG. 16.

Figure 20:
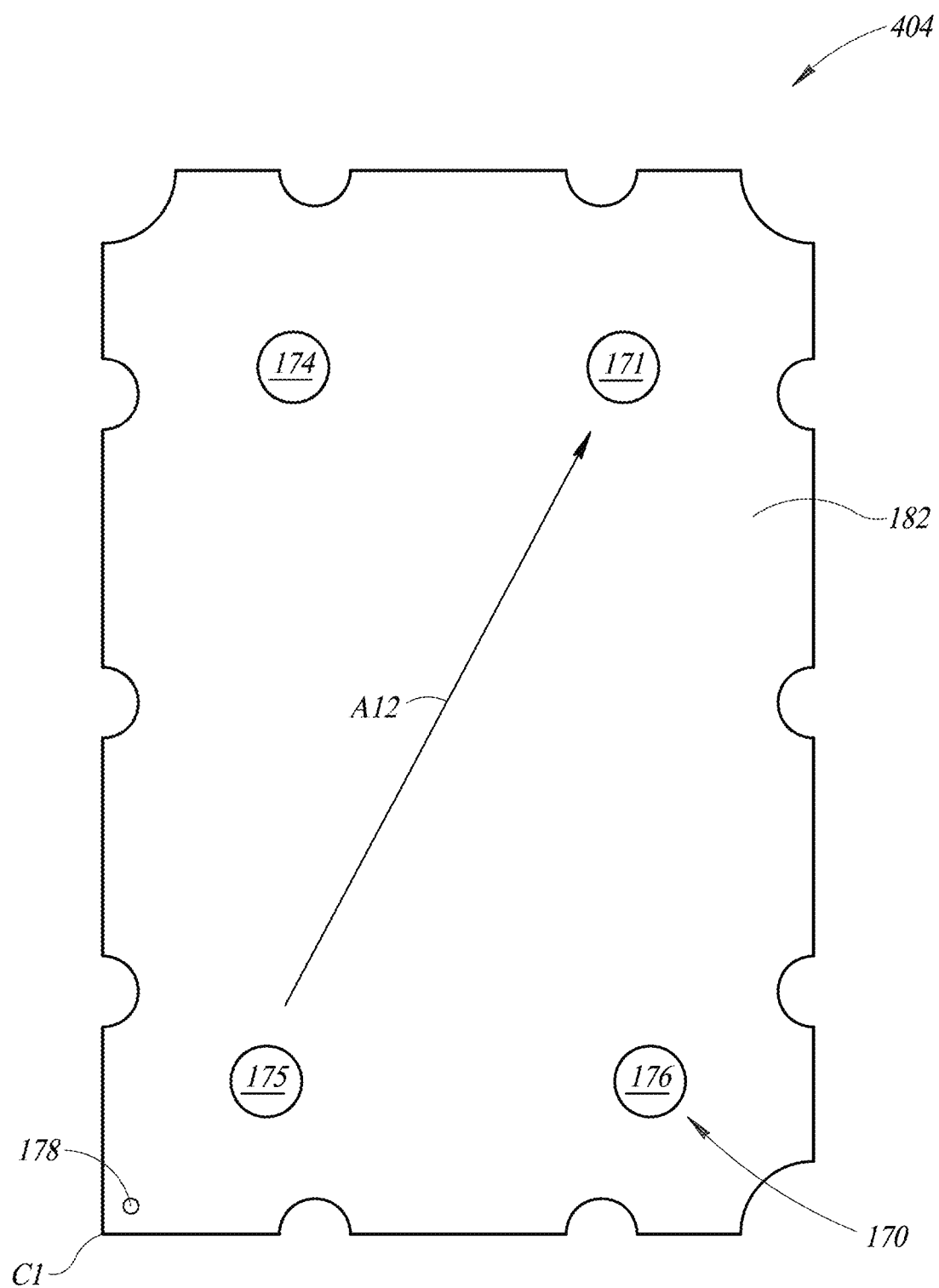

FIG. 20 is a view of a second side of a second neutral plate of the hydrogen generator of FIG. 16.

Figure 21:
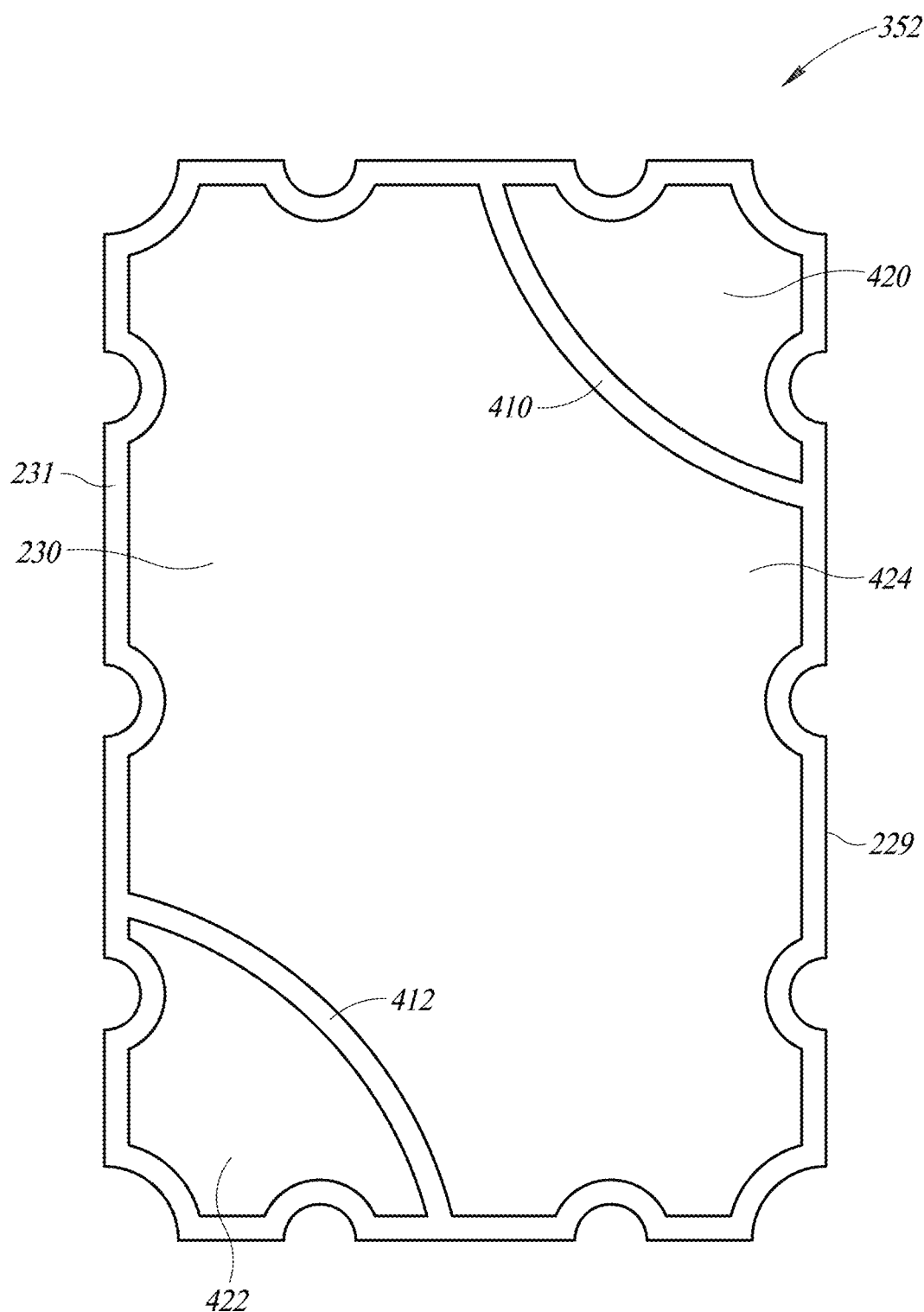

FIG. 21 is a front view of a seal of the hydrogen generator of FIG. 16.

Figure 22:
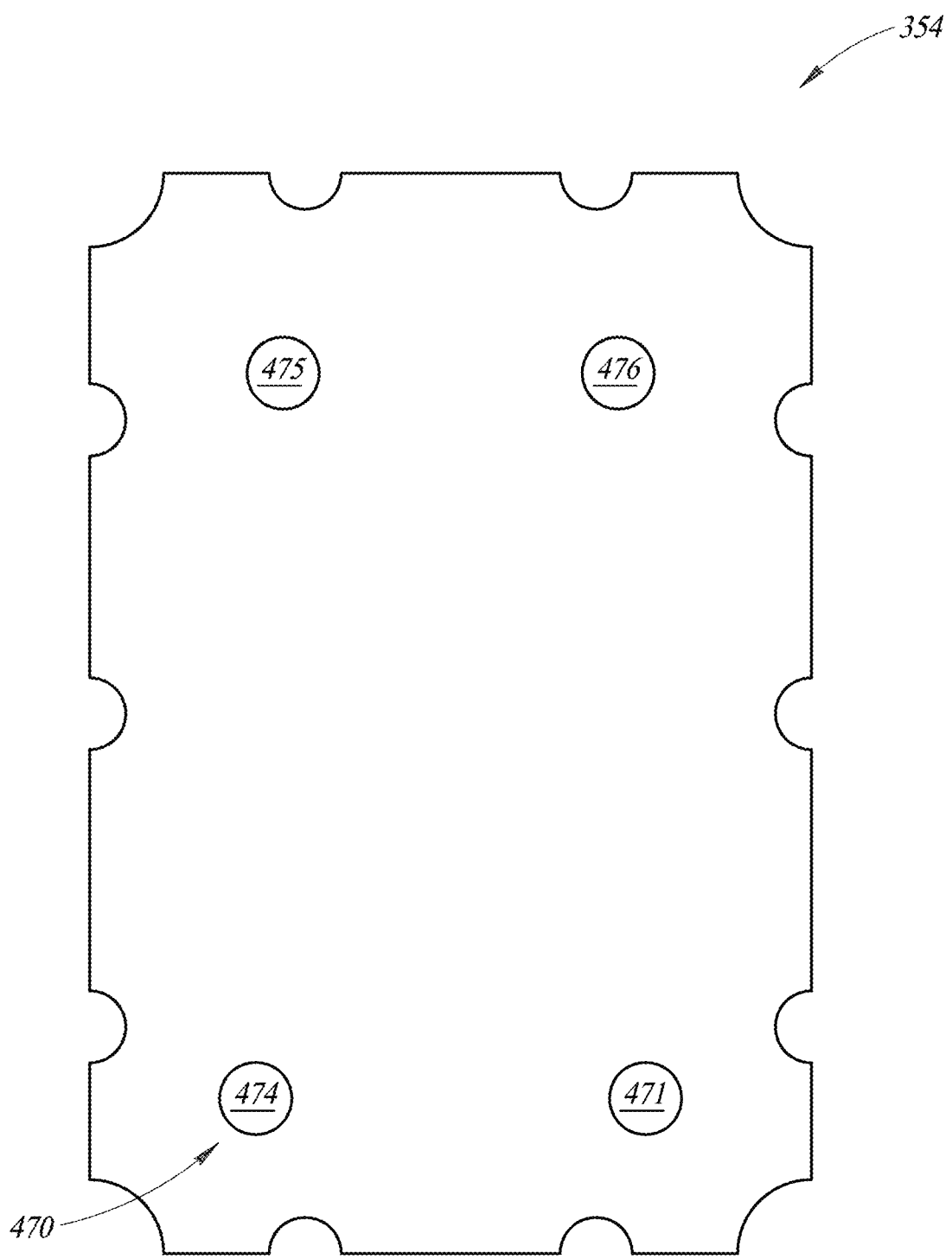

FIG. 22 is a front view of a membrane of the hydrogen generator of FIG. 16.

Figure 23:
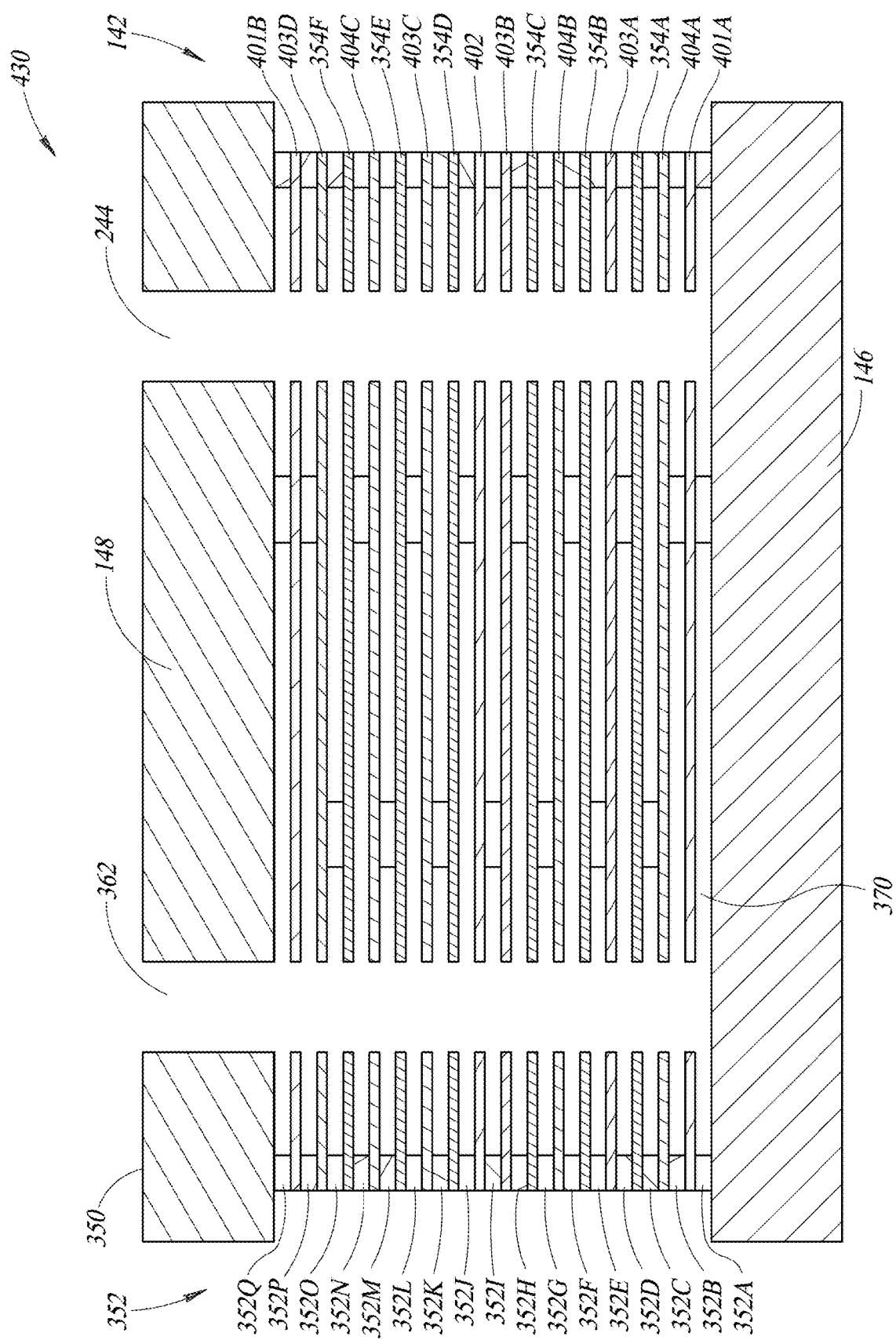

FIG. 23 is a top view of a slice taken through the hydrogen generator of FIG. 16.

Figure 24:
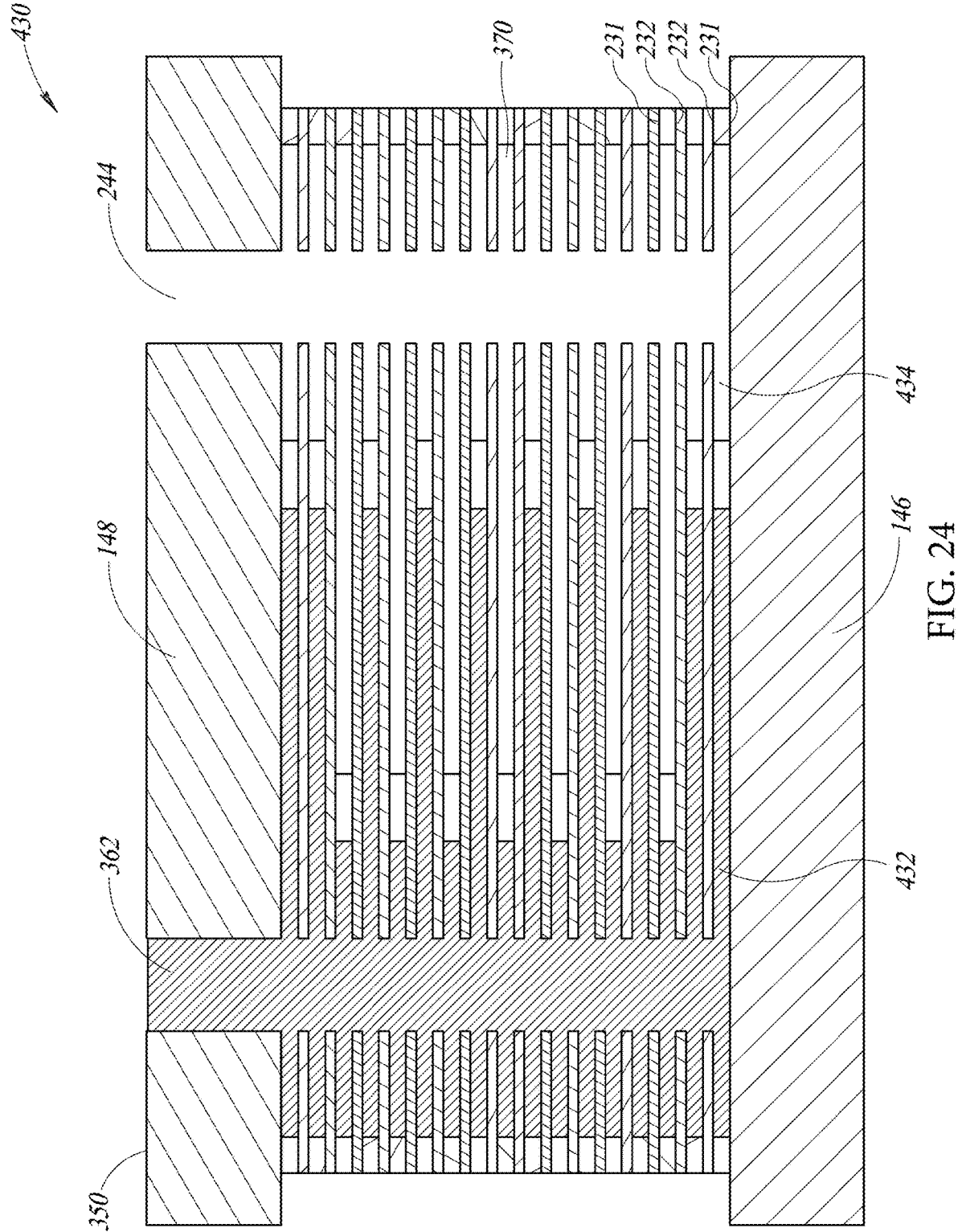

FIG. 24 is a top view of the slice of FIG. 23 illustrated with its first gas chamber shaded.

Figure 3:
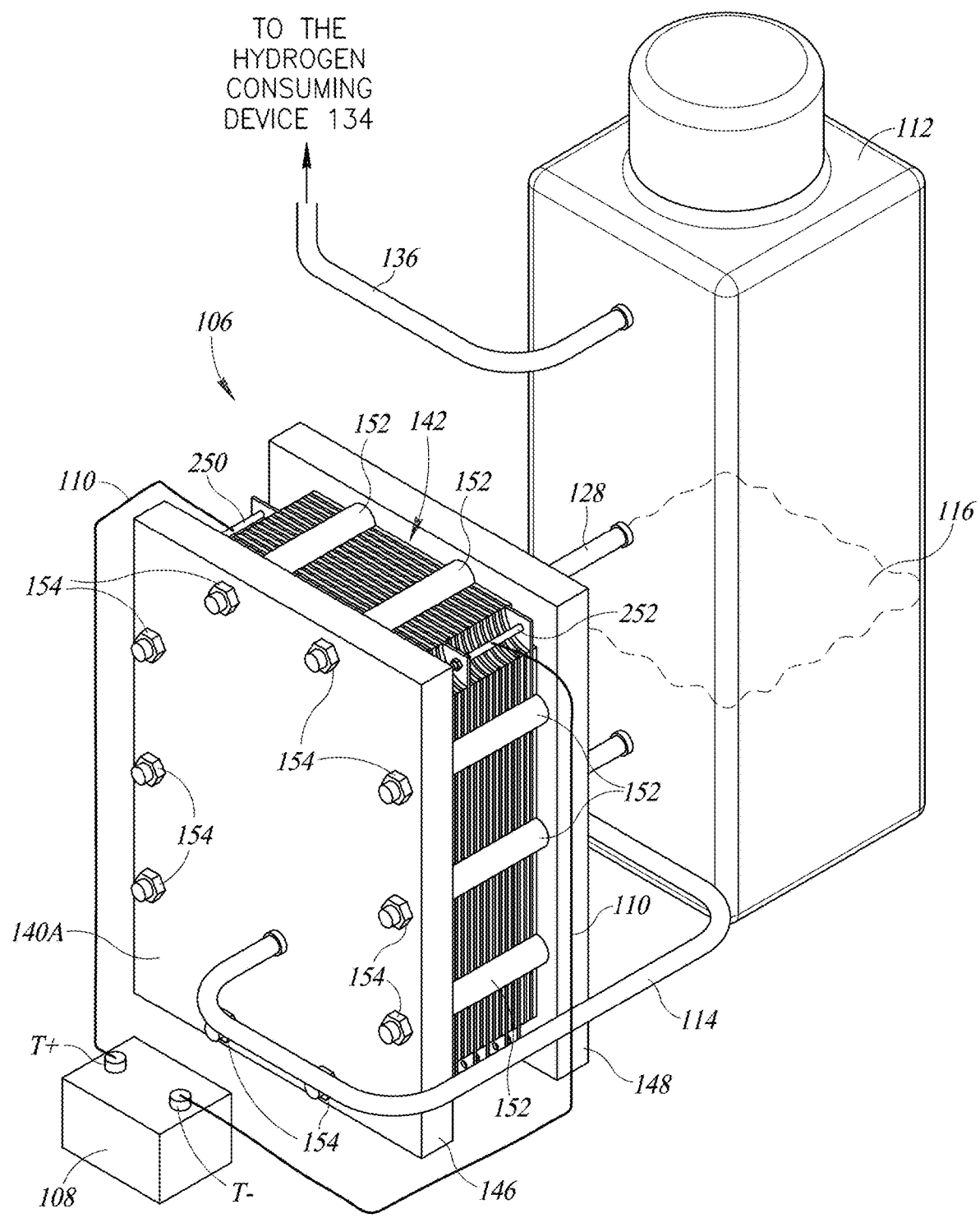
FIG. 3 is a perspective view of a first embodiment of the hydrogen generator connected to both a water source and a power controller.
Figure 25:
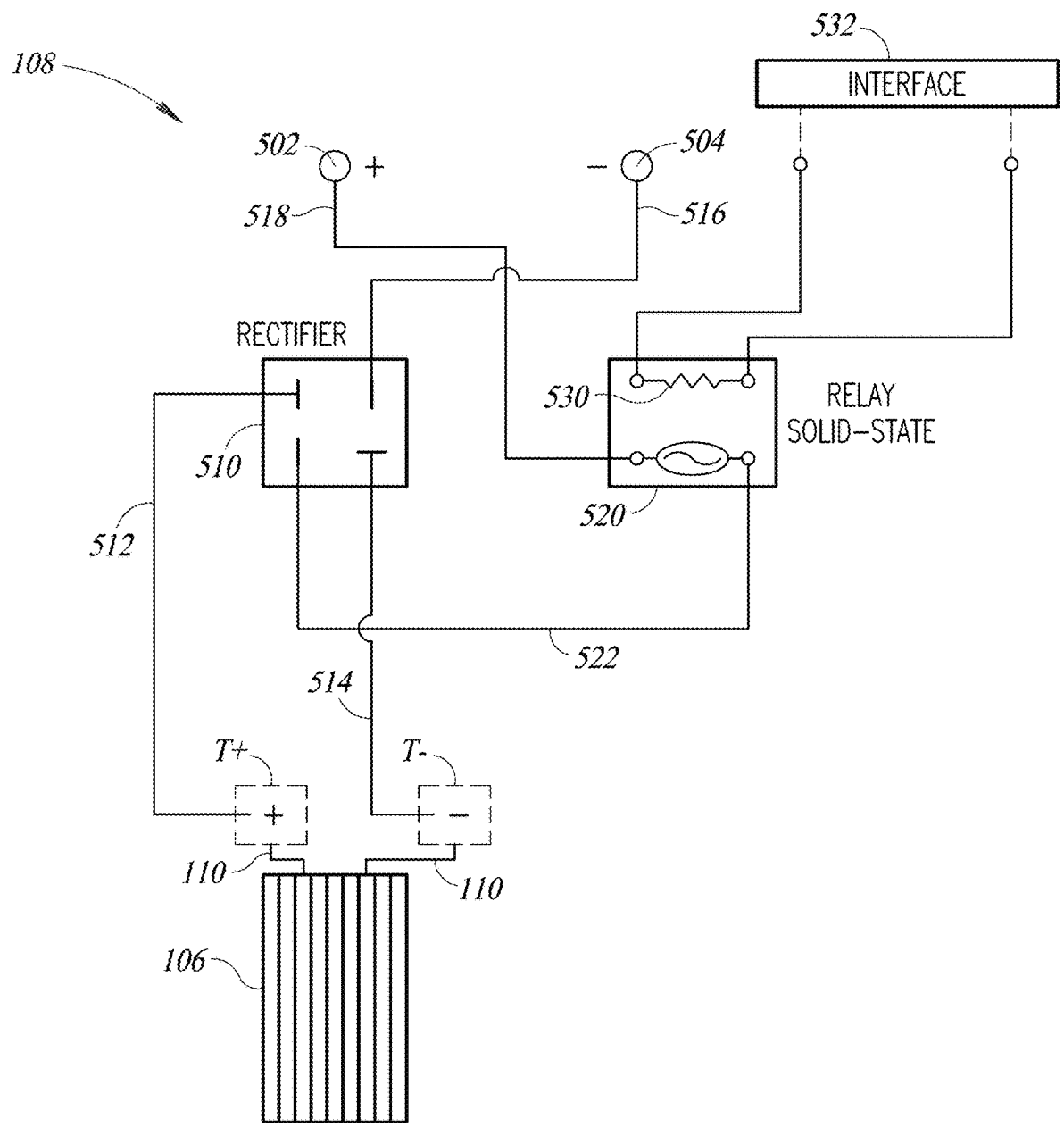

FIG. 25 is a circuit diagram of the power controller configured for use with the hydrogen generators of FIGS. 3 and 16.

Like reference numerals have been used in the figures to identify like components.

DETAILED DESCRIPTION OF THE INVENTION

Figure 1:
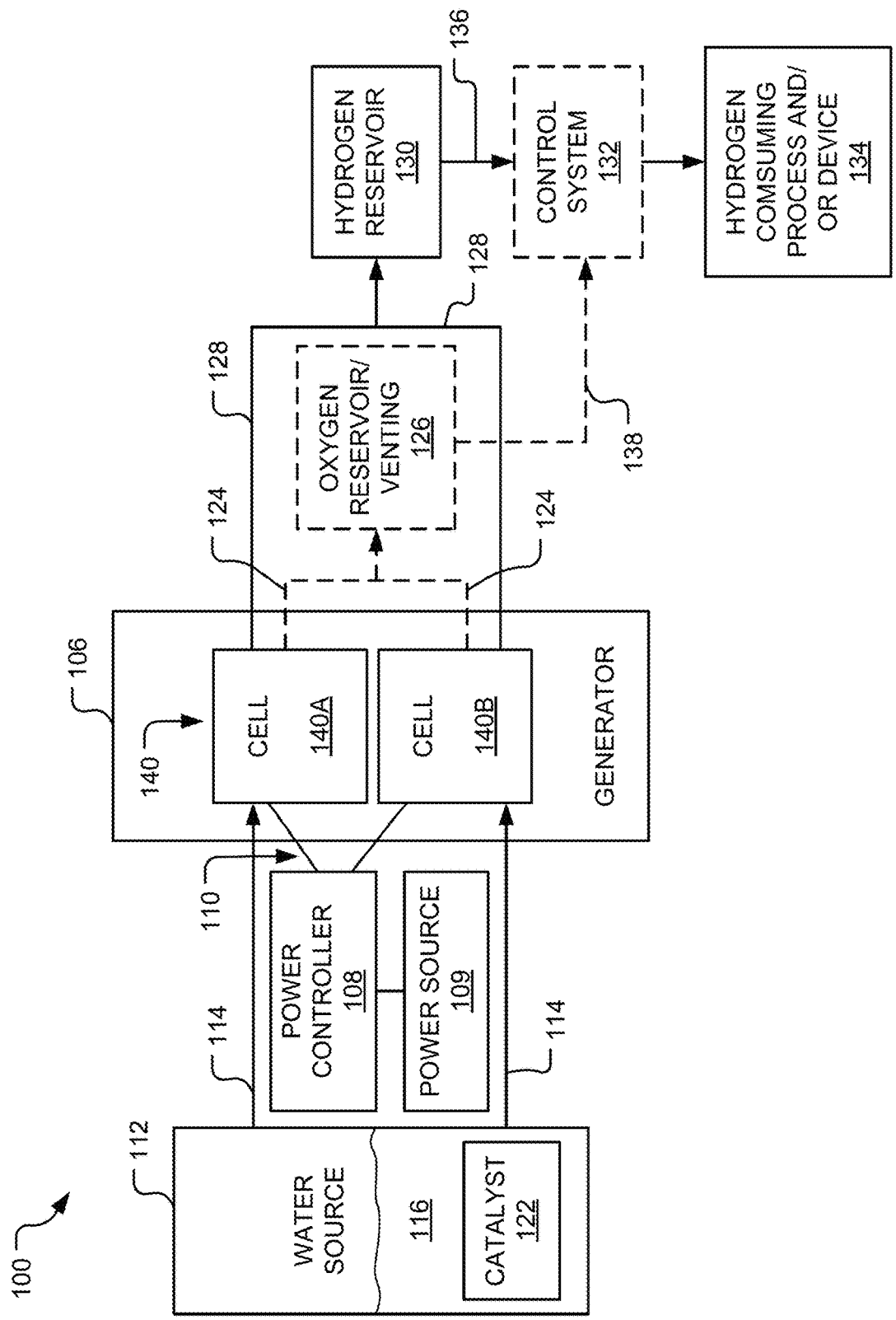
FIG. 1 is a block diagram of a system that includes a hydrogen generator.

FIG. 1 is a block diagram of a system 100 that includes a hydrogen generator 106. The hydrogen generator 106 is connected to an electrical power controller 108 by electrical conductors 110 (e.g., wires). The power controller 108 may be configured to deliver direct current ("DC") to the hydrogen generator 106. As shown in FIG. 3, the power controller 108 has a positive terminal T+ and a negative terminal T−. The power controller 108 is configured to determine a voltage of the current delivered to the hydrogen generator 106. Thus, the power controller 108 is configured to deliver current having an adjustable voltage. The power controller 108 is connected to or includes a power source 109 that may be implemented as a battery or a power converter configured to receive alternating current ("AC") from an AC source (e.g., a conventional wall socket) and convert the AC to DC.

Figure 2:
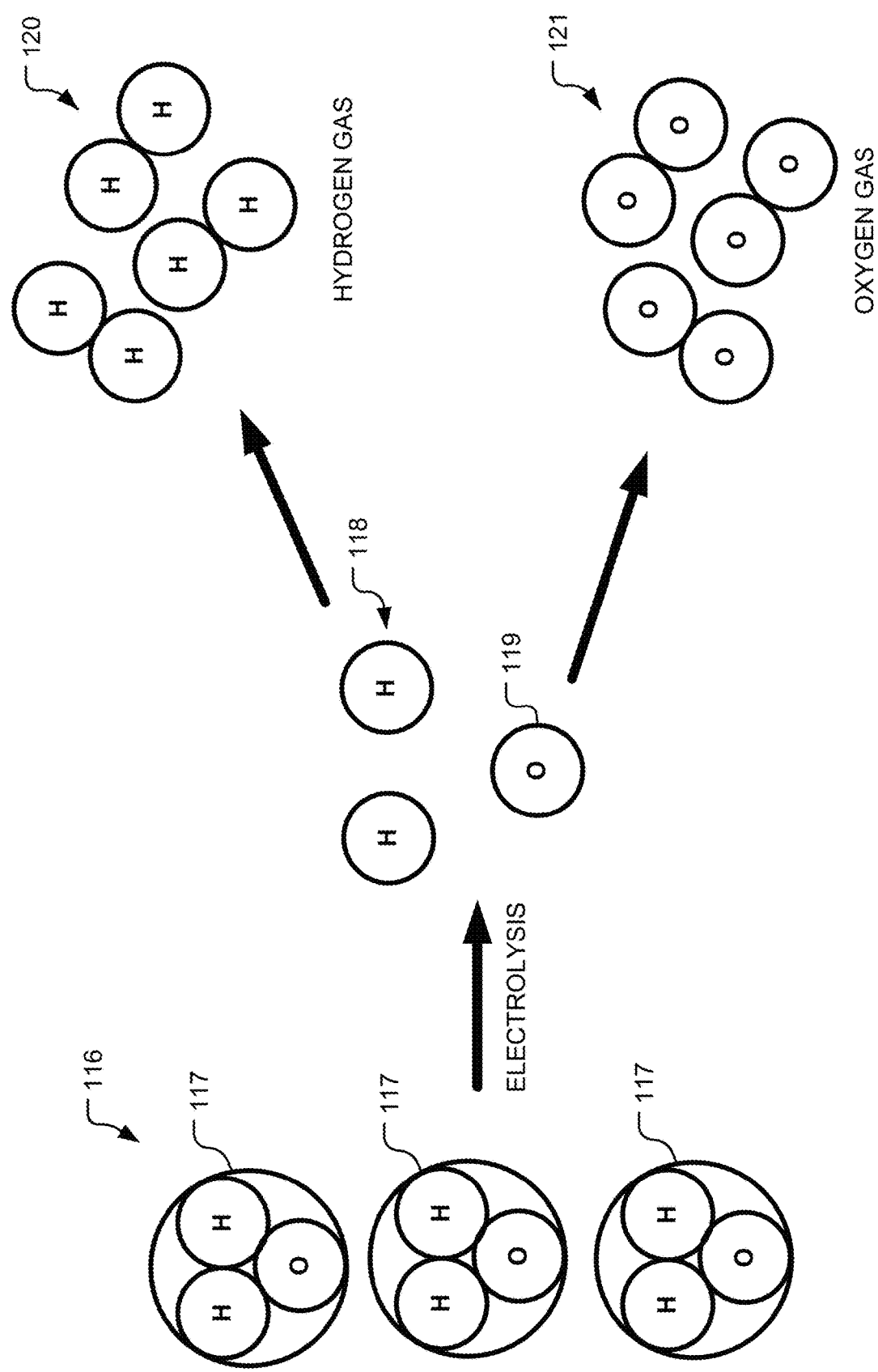
FIG. 2 is an illustration of water being split by electrolysis into hydrogen and oxygen.

The hydrogen generator 106 is connected to a water source 112 (e.g., a water tank) by one or more water lines 114. The hydrogen generator 106 is configured to receive water 116 from the water source 112. Referring to FIG. 2, the hydrogen generator 106 uses electrolysis to split water molecules ($H_2O$) 117 (in the water 116) into hydrogen (H) atoms 118 and oxygen (O) atoms 119. Next, two of the hydrogen atoms 118 combine to form hydrogen gas ($H_2$) 120, and two of the oxygen (0) atoms 119 combine to form oxygen gas ($O_2$) 121.

Referring to FIG. 1, the water 116 may include a catalyst 122, such as potassium hydroxide (KOH). By way of a non-limiting example, the water source 112 may be configured to hold about 5 liters of water. About 600 grams of the catalyst 122 (e.g., KOH) may be added to the 5 liters of water. In other words, about 120 grams of the catalyst 122 may be added per liter of water.

The hydrogen gas 120 (see FIG. 2) produced by the hydrogen generator 106 may be conducted (e.g., by one or more hydrogen gas lines 128) to a hydrogen reservoir 130. In some embodiments, the water source 112 may also function as the hydrogen reservoir 130. The hydrogen gas 120 (see FIG. 2) may be conducted (e.g., by one or more gas lines 136) from the hydrogen reservoir 130 to an optional gas control system 132 that is configured to transfer the hydrogen gas 120 to a hydrogen consuming process and/or device 134. If the optional gas control system 132 has been omitted, the gas line(s) 136 may conduct the hydrogen gas 120 (see FIG. 2) directly to the hydrogen consuming process and/or device 134. Alternatively, the hydrogen gas 120 (see FIG. 2) may remain in the hydrogen reservoir 130 for later use.

The oxygen gas 121 (see FIG. 2) produced by the hydrogen generator 106 may be conducted (e.g., by the hydrogen gas line(s) 128 and/or one or more oxygen gas lines 124) to an oxygen reservoir 126. In some embodiments, the hydrogen reservoir 130 and/or the water source 112 may function as the oxygen reservoir 126. The oxygen gas 121 (see FIG. 2) may be conducted (e.g., by one or more oxygen gas lines 138) from the oxygen reservoir 126 to the optional gas control system 132 or the hydrogen consuming process and/or device 134. Alternatively, the oxygen gas 121 (see FIG. 2) may be vented into the surrounding environment instead of being conducted to the oxygen reservoir 126. By way of yet another non-limiting example, the oxygen gas 121 (see FIG. 2) may remain in the oxygen reservoir 126 for later use.

The hydrogen generator 106 includes one or more cells 140. In the example illustrated, the hydrogen generator 106 includes cells 140A and 140B, which are substantially identical to one another. However, the hydrogen generator 106 may include any number of cells each like the cells 140A and 140B. For example, FIG. 3 illustrates an implementation in which the hydrogen generator 106 includes only the cell 140A. When the hydrogen generator 106 includes more than one cell, such as the cells 140A and 140B, the electrical conductors 110 may connect the power controller 108 to the cells in series. The water source 112 may be connected to the cells in parallel.

In the embodiment illustrated in FIG. 3, the water source 112 functions as both the hydrogen reservoir 130 and the oxygen reservoir 126. Thus, the hydrogen gas line(s) 128 connect the hydrogen generator 106 to the water source 112 and conduct both the hydrogen gas 120 (see FIG. 2) and the oxygen gas 121 (see FIG. 2) into the water source 112. Then, the gas line(s) 136 conduct both the hydrogen gas 120 (see FIG. 2) and the oxygen gas 121 (see FIG. 2) from the water source 112 to the optional gas control system 132 (see FIG. 1) or the hydrogen consuming process and/or device 134 (see FIG. 1). In the embodiment illustrated in FIG. 3, the cell 140A includes a plurality of plates 142, a plurality of seals 144 (see FIGS. 4A, 5, and 11), a first end cap 146, a second end cap 148, a plurality of ties 152, and an optional plurality of fasteners 154 (e.g., nuts).

Figure 6:
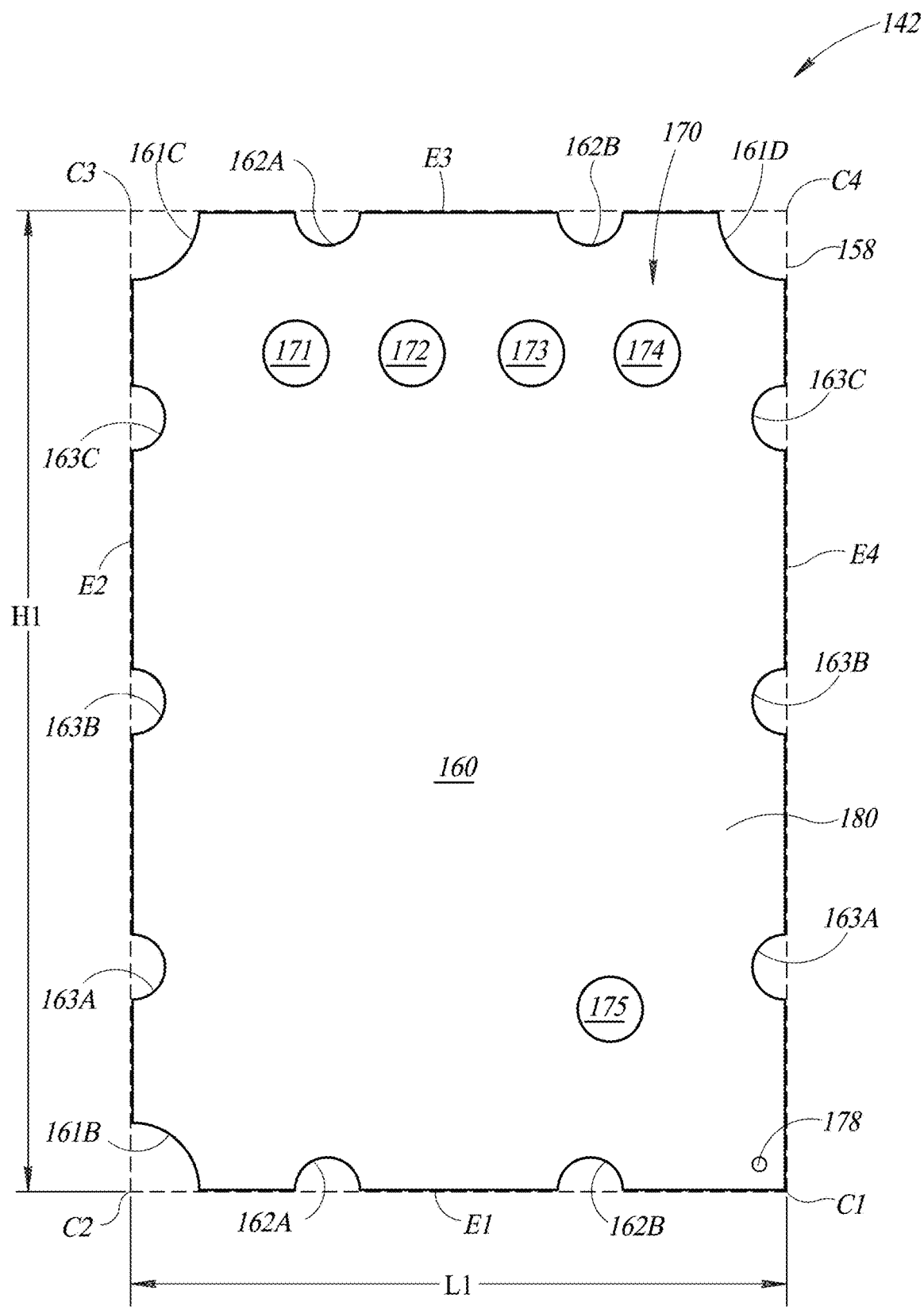
FIG. 6 is a view of a first side of a plate of the hydrogen generator of FIG. 3.

Referring to FIG. 6, each of the plates 142 has a generally rectangular outer shape 158 surrounding a body portion 160. The generally rectangular outer shape 158 has a length L1 (e.g., about 10 cm) and a height H1 (e.g., about 15 cm). The generally rectangular outer shape 158 has four corners C1-C4 and four edges E1-E4. The corners C2-C4 are each notched or cutout to define cutouts 161B-161D. The cutouts 161B-161D may each have a quarter-circle shape centered at the corners C2-C4, respectively. By way of a non-limiting example, when the cutouts 161B-161D have a quarter-circle shape, they may each have a radius of about 1.0 cm. In the embodiment illustrated, each of the plates 142 is generally planar.

In the embodiment illustrated, the edges E1 and E3 are shorter than the sides E2 and E4. The edges E1-E4 each have cutouts formed therein. The shorter edges E1 and E3 each have two cutouts 162A and 162B, and the longer edges E2 and E4 each have three cutouts 163A-163C. Each of the cutouts 162A-163C may have a semicircular shape centered on the edge in which the cutout is formed. By way of a non-limiting example, each of the cutouts 162A-163C may have a radius of about 0.5 cm.

The following are exemplary minimum distances defining positions of the cutouts 162A and 162B formed in each of the edges E1 and E3. A minimum distance between the cutout 162A and the cutout 162B may be about 3 cm. A minimum distance between the cutout 162A formed in the edge E1 and the corner C2 may be about 2.5 cm. Similarly, a minimum distance between the cutout 162A formed in the edge E3 and the corner C3 may be about 2.5 cm. A minimum distance between the cutout 162B formed in the edge E1 and the corner C1 may be about 2.5 cm. Similarly, a minimum distance between the cutout 162B formed in the edge E3 and the corner C4 may be about 2.5 cm.

The following are exemplary minimum distances defining positions of the cutouts 163A-163C formed in each of the edges E2 and E4. A minimum distance between the cutout 163A and the cutout 163B may be about 3 cm. A minimum distance between the cutout 163B and the cutout 163C may be about 3.2 cm. A minimum distance between the cutout 163A formed in the edge E2 and the corner C2 may be about 3 cm. Similarly, a minimum distance between the cutout 163A formed in the edge E4 and the corner C1 may be about 3 cm. A minimum distance between the cutout 163C formed in the edge E2 and the corner C3 may be about 2.8 cm. Similarly, a minimum distance between the cutout 163C formed in the edge E4 and the corner C4 may be about 2.8 cm.

The body portion 160 includes a plurality of through-holes 170. A first embodiment of the plates 142 is illustrated in FIGS. 3-10. Referring to FIG. 6, in the first embodiments, the through-holes 170 include five through-holes 171-175. By way of a non-limiting example, each of the through-holes 171-175 may have a circular shape with a radius of about 0.5 cm. The through-holes 171-174 are arranged linearly in a series that is substantially parallel with the edges E1 and E3. The through-holes 171-174 are positioned nearer the edge E3 than the edge E1. The through-holes 171 and 172 are spaced apart by a minimum distance of about 0.8 cm. The through-holes 172 and 173 are spaced apart by a minimum distance of about 0.8 cm. The through-holes 173 and 174 are spaced apart by a minimum distance of about 0.8 cm. The through-holes 171-174 are spaced apart by a minimum distance of about 1.6 cm from the edge E3. The through-hole 171 is spaced apart by a minimum distance of about 2.0 cm from the edge E2. The through-hole 174 is spaced apart by a minimum distance of about 1.6 cm from the edge E4. The through-hole 175 is positioned nearer the edge E1 than the edge E3. In the embodiment illustrated, the through-hole 175 is spaced apart by a minimum distance of about 2.2 cm from each of the edges E1 and E4.

The body portion 160 may have an optional through-hole 178 positioned closer to the corner C1 than the through-hole 175. By way of a non-limiting example, the through-hole 178 may have a circular shape with a radius of about 0.2 cm. The through-hole 178 may be spaced apart by a minimum distance of about 0.3 cm from each of the edges E1 and E4.

While exemplary dimensions are provided above, through application of ordinary skill in the art to the present teachings, the plates 142 may be sized or scaled appropriately for a desired application. For example, smaller plates may be used if less hydrogen is desired. Similarly, larger plates or multiple cells may be used if more hydrogen is desired. Each of the plates 142 is constructed from a substantially electrically conductive material. By way of a non-limiting example, each of the plates 142 may be constructed from stainless steel and the like.

Figure 4A:
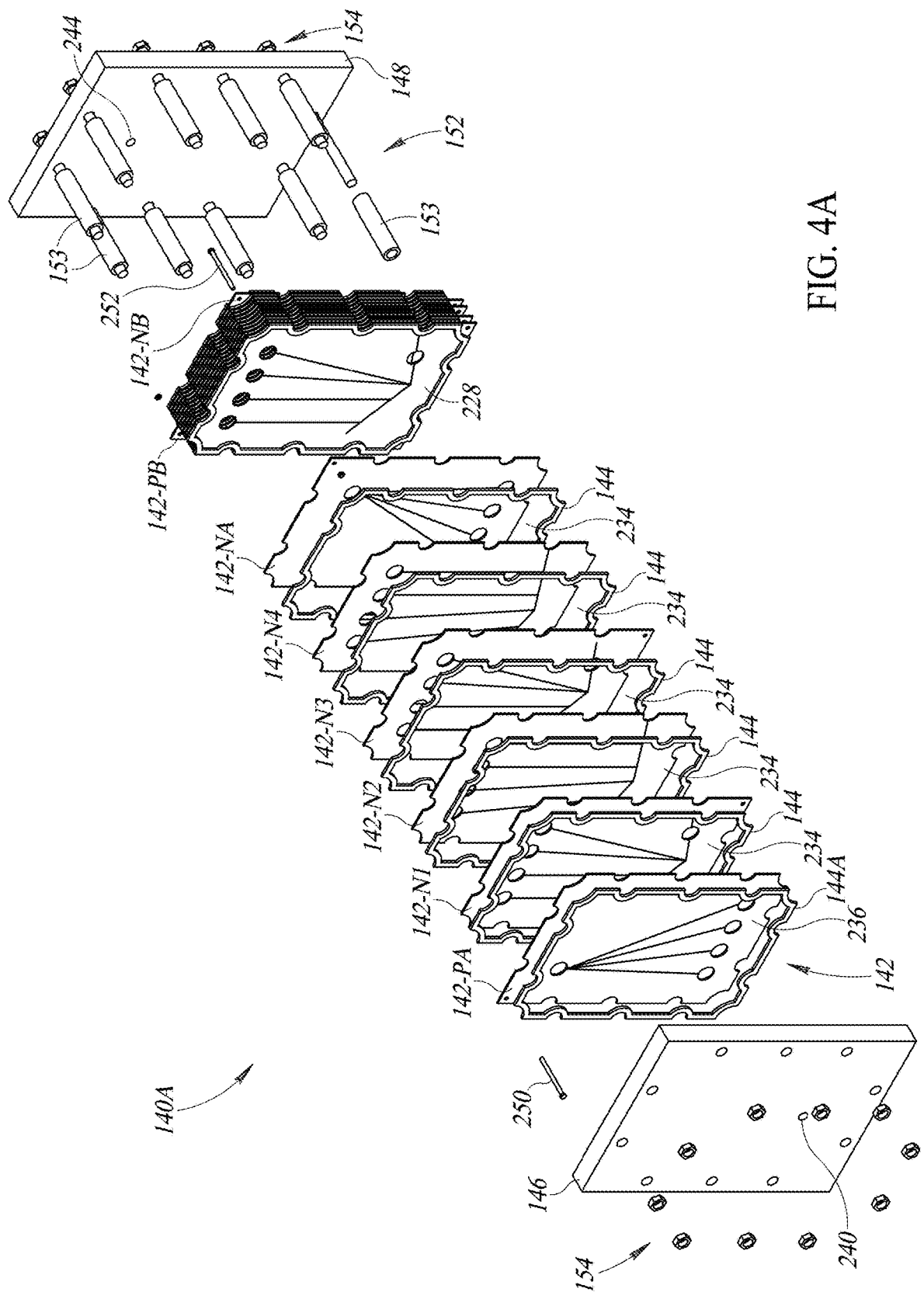
FIG. 4A is a first partially exploded perspective view of the hydrogen generator of FIG. 3.
Figure 4B:
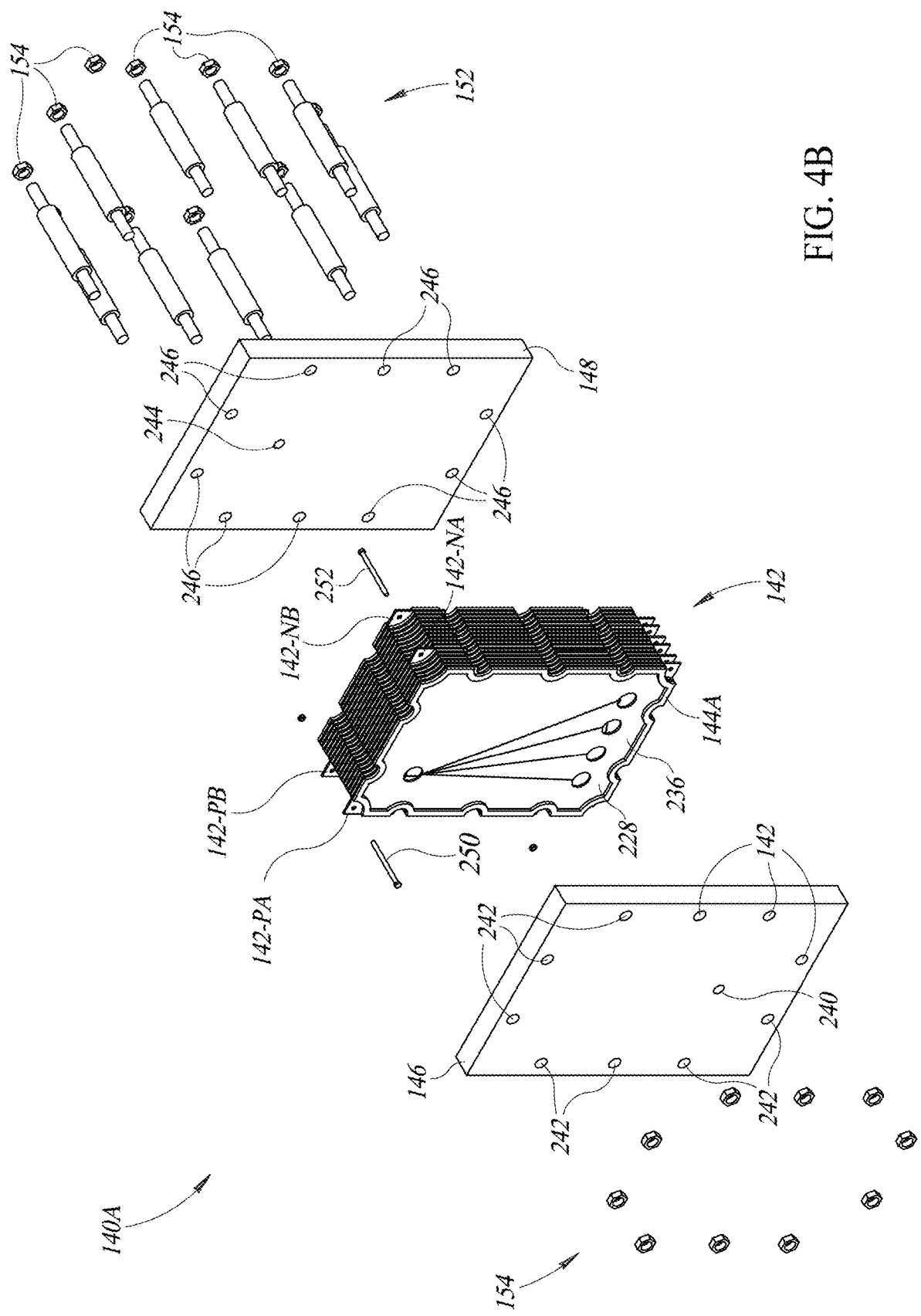
FIG. 4B is a second partially exploded perspective view of the hydrogen generator of FIG. 3.
Figure 5:
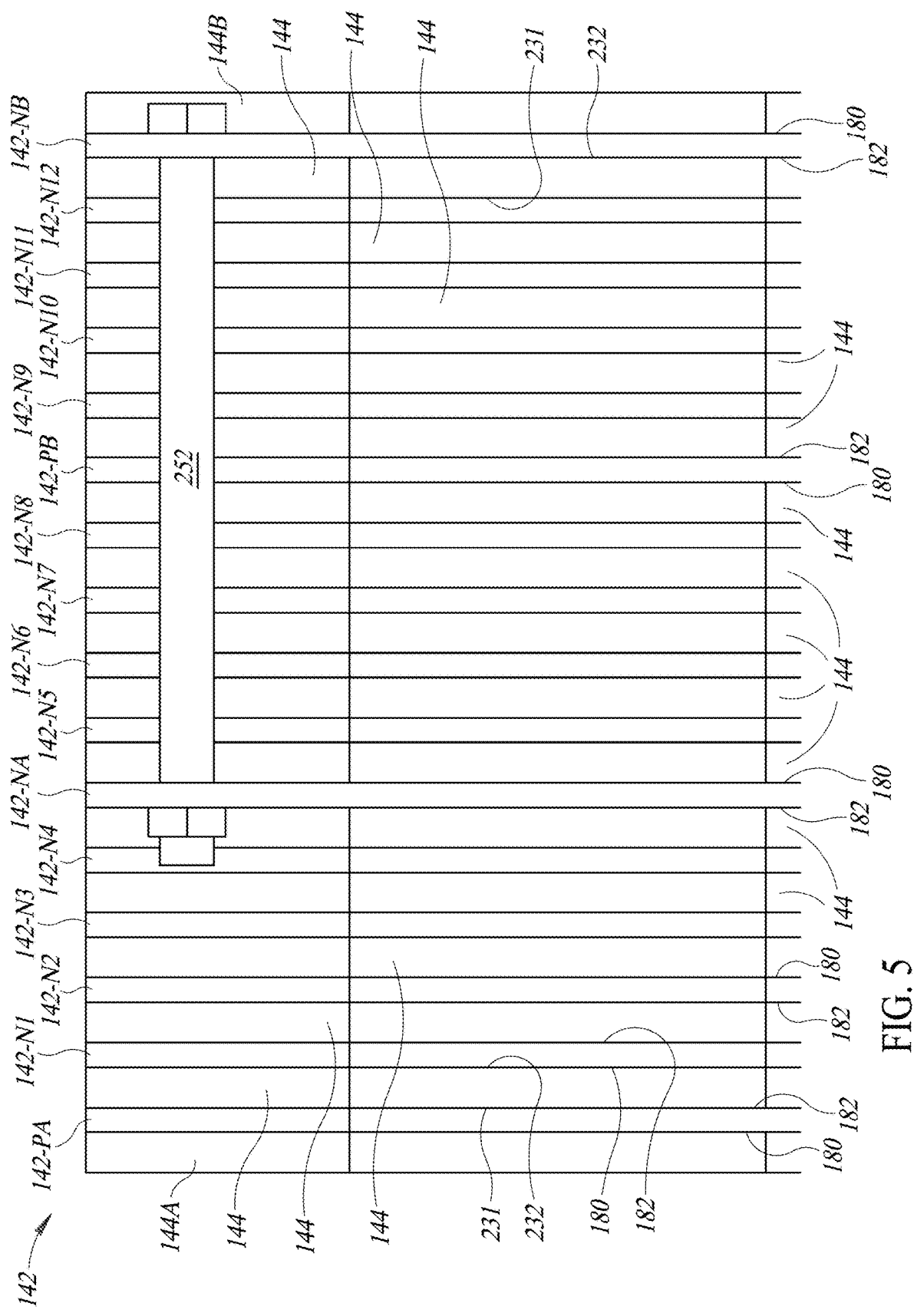
FIG. 5 is an enlarged side view of an upper portion of the hydrogen generator of FIG. 3 omitting its ties and first and second end caps.
Figure 7:
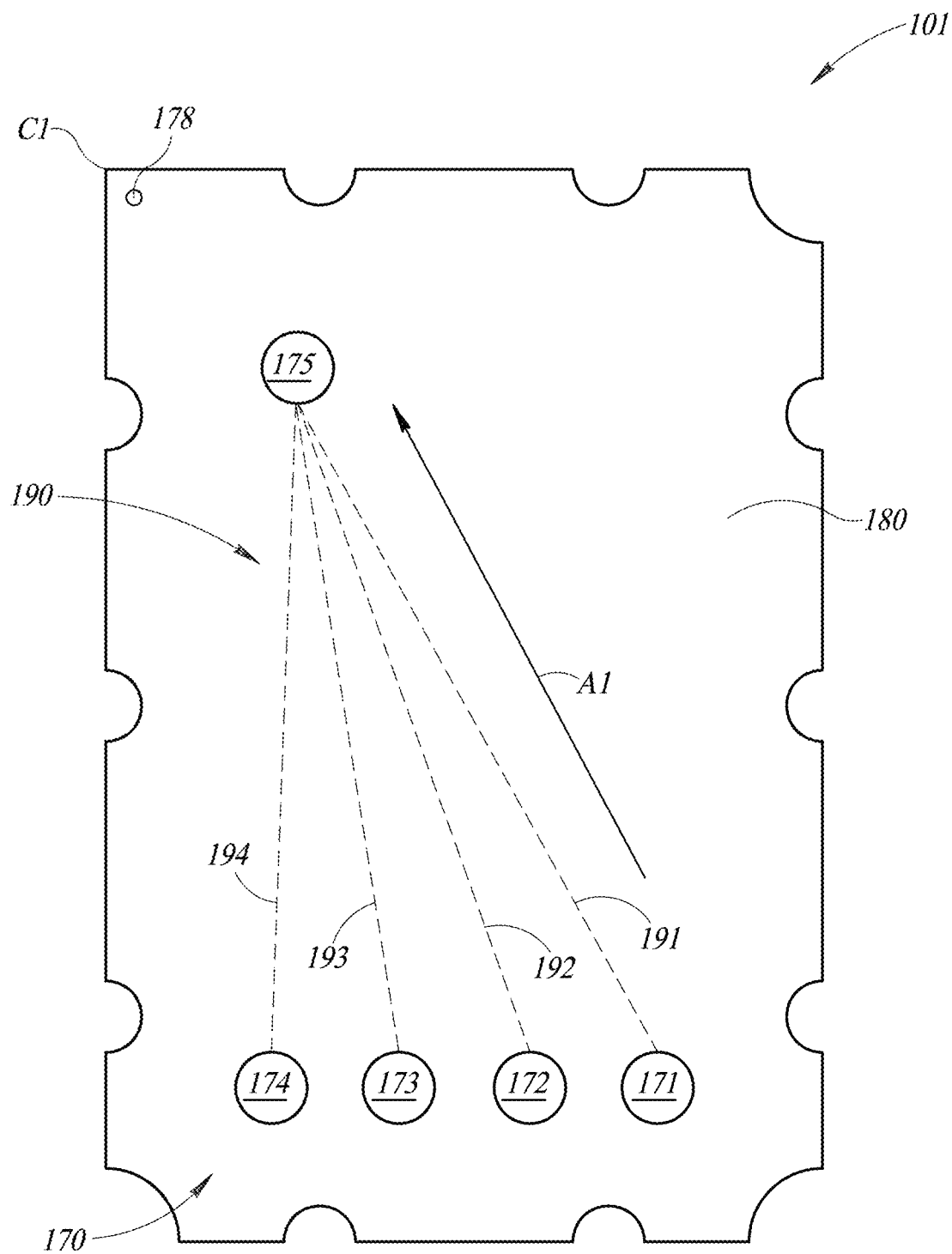
FIG. 7 is a view of a first side of a first embodiment of a positive plate of the hydrogen generator of FIG. 3.
Figure 8:
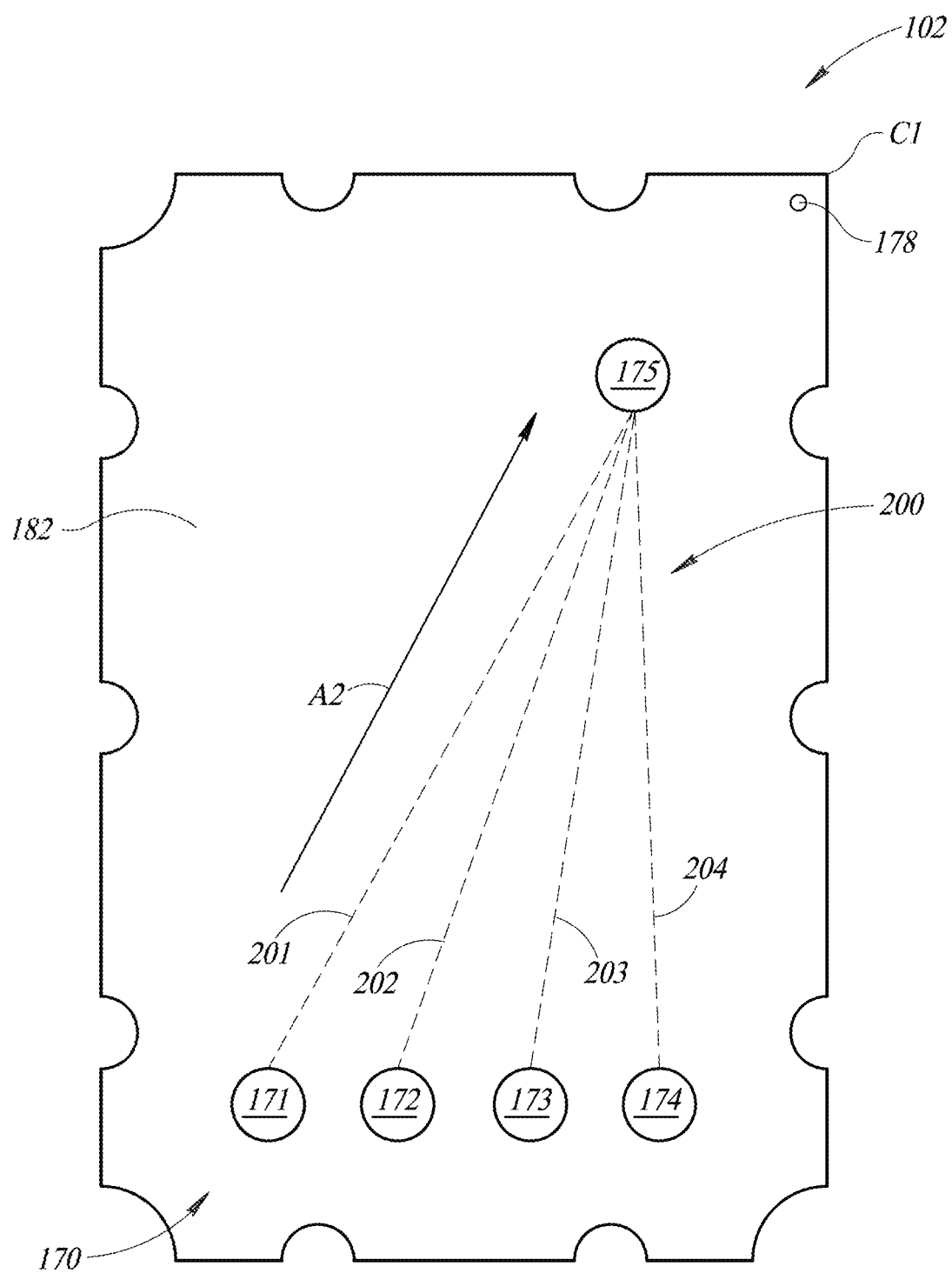
FIG. 8 is a view of a second side of a first embodiment of a negative plate of the hydrogen generator of FIG. 3.

Referring to FIG. 5, the plates 142 are substantially parallel with one another and arranged in a series. The plates 142 include one or more positive plates 101 (see FIG. 7), one or more negative plates 102 (see FIG. 8), and one or more neutral plates positioned in between each adjacent pair of positive and negative plates. For example, the neutral plate(s) may include a first neutral plate 103 (see FIG. 9) and a second neutral plate 104 (see FIG. 10), which may alternate inside the cell 140A (see FIGS. 1 and 3-4B). Referring to FIG. 7, the oxygen atoms 119 (see FIG. 2) collect along each of the positive plate(s) 101 and a first side 180 or a second side 182 (see FIGS. 5, 8, 10, 13, 15, 18, and 20) of any of the first and second neutral plates 103 (see FIG. 9) and 104 (see FIG. 10) facing the positive plate 101. Referring to FIG. 8, the hydrogen atoms 118 (see FIG. 2) collect along each of the negative plate(s) 102 and the first side 180 (see FIGS. 5-7, 9, 12, 14, 17, and 19) or the second side 182 of any of the first and second neutral plates 103 (see FIG. 9) and 104 (see FIG. 10) facing the negative plate 102.

Figure 9:
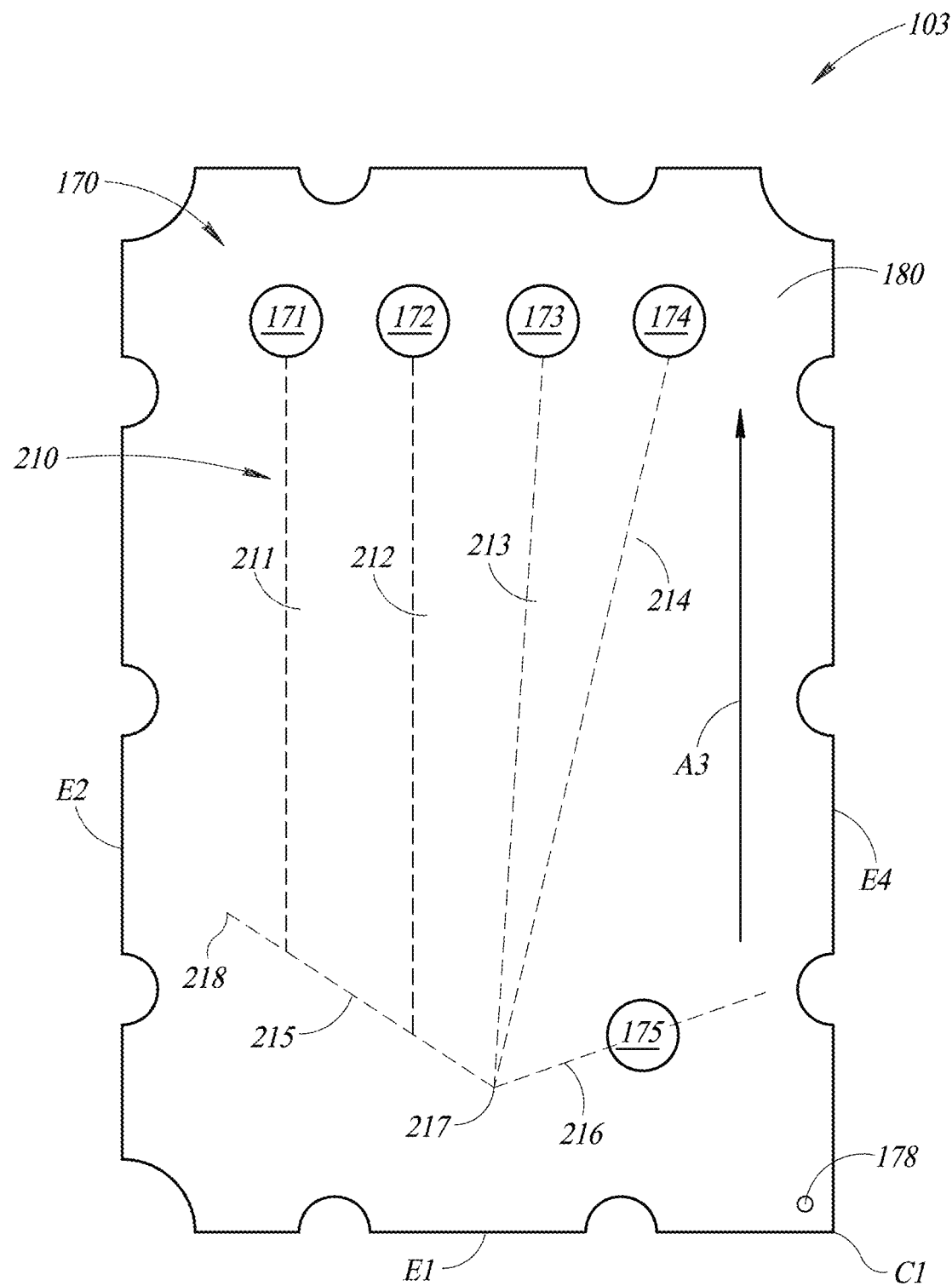
FIG. 9 is a view of a first side of a first embodiment of a first neutral plate of the hydrogen generator of FIG. 3.
Figure 10:
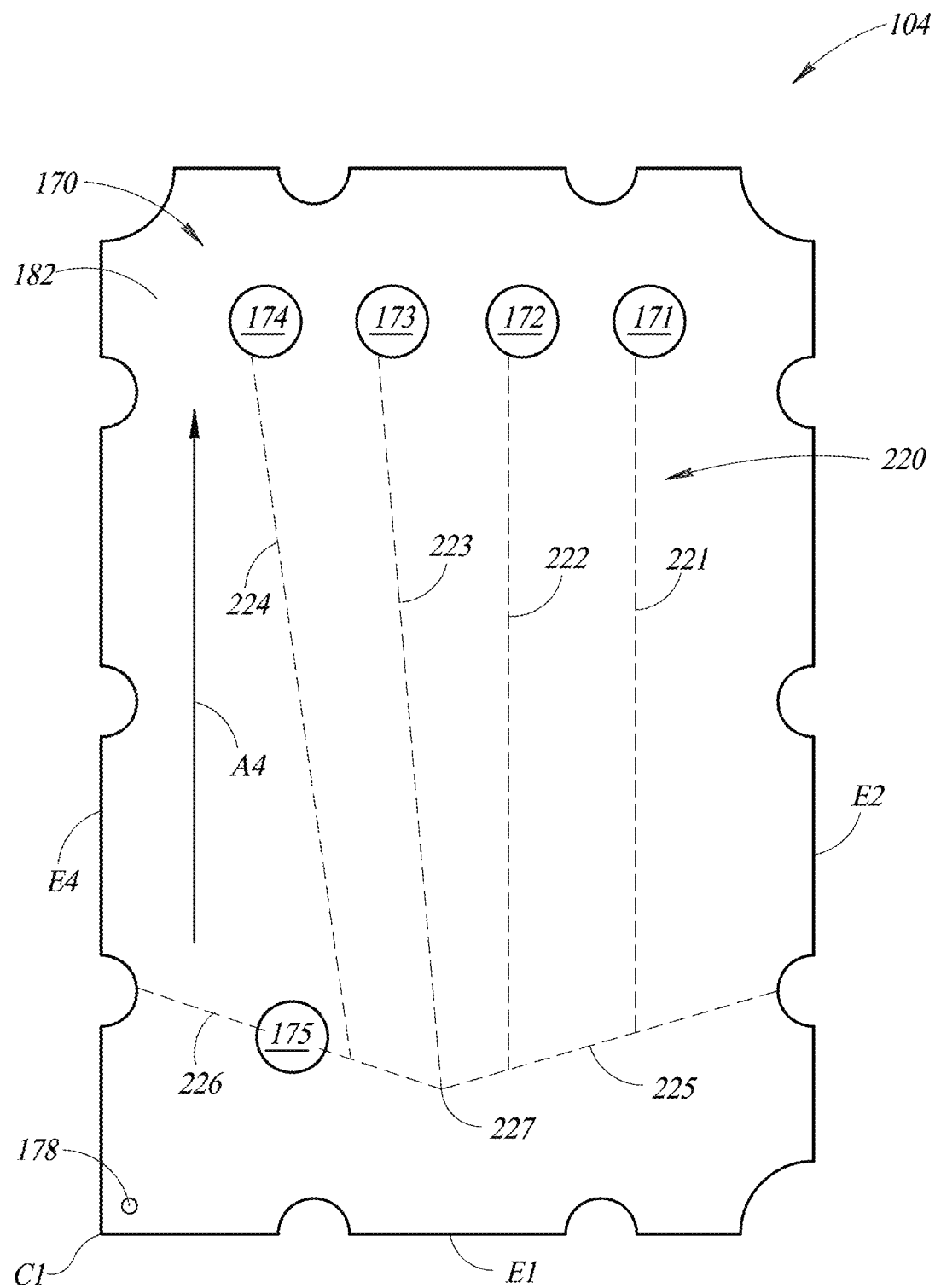
FIG. 10 is a view of a second side of a first embodiment of a second neutral plate of the hydrogen generator of FIG. 3.

Referring to FIG. 5, in the embodiment illustrated, the plates 142 include two positive plates 142-PA and 142-PB (each like the positive plate 101 illustrated in FIG. 7), two negative plates 142-NA and 142-NB (each like the negative plate 102 illustrated in FIG. 8), six first neutral plates 142-N1, 142-N3, 142-N5, 142-N7, 142-N9, and 142-N11 (each like the first neutral plate 103 illustrated in FIG. 9), and six second neutral plates 142-N2, 142-N4, 142-N6, 142-N8, 142-N10, and 142-N12 (each like the second neutral plate 104 illustrated in FIG. 10). Inside the cell 140A (see FIGS. 1 and 3-4B), the plates 142 may be arranged in the following predetermined order from the first end cap 146 (see FIGS. 3-4B, 16, 23, and 24) to the second end cap 148 (see FIGS. 3-4B, 16, 23, and 24): positive plate 142-PA, first neutral plate 142-N1, second neutral plate 142-N2, first neutral plate 142-N3, second neutral plate 142-N4, negative plate 142-NA, first neutral plate 142-N5, second neutral plate 142-N6, first neutral plate 142-N7, second neutral plate 142-N8, positive plate 142-PB, first neutral plate 142-N9, second neutral plate 142-N10, first neutral plate 142-N11, second neutral plate 142-N12, and negative plate 142-NB.

A pattern may be formed (e.g., etched, scratched, laser cut, embossed, printed, etc.) on the first and/or second sides 180 and 182 of each of the plates 142. The patterns may be configured to help direct water flow and/or gas flow through the cell 140A (see FIGS. 1 and 3-4B). The patterns may be configured to generate a desired volume of hydrogen gas at a desired rate. The patterns may help induce a desired current flow in the water 116 (see FIGS. 1-3). The patterns may help direct the hydrogen and oxygen gases 120 and 121 (see FIG. 2) through the through-holes 171-175 (see FIGS. 6-10) and toward the second end cap 148 (see FIGS. 3-4B, 16, 23, and 24).

As mentioned above, each of the positive plates 142-PA and 142-PB (see FIGS. 4A and 5) may be implemented as the positive plate 101 (see FIG. 7). Referring to FIG. 7, the positive plate 101 includes a positive pattern 190 formed on its first side 180. As illustrated in FIG. 7, the positive plate 101 is oriented with its corner C1 positioned in an upper left position when the first side 180 is facing forwardly (or toward the first end cap 146 illustrated in FIGS. 3-4B, 16, 23, and 24). The positive pattern 190 includes four lines 191-194 that extend from the through-holes 171-174, respectively, to the through-hole 175. In the embodiment illustrated, the lines 191-194 intersect at a point on the edge of the through-hole 175. The lines 191-194 induce flow toward the through-hole 175 in a first flow direction identified by an arrow A1. Each of the lines 191-194 may be formed as a continuous line or by a plurality of through-holes arranged in a series to define the line. The plurality of through-holes may each have a diameter of about 1 millimeter ("mm") to about 2 mm.

As mentioned above, each of the negative plates 142-NA and 142-NB (see FIGS. 4A and 5) may be implemented as the negative plate 102 (see FIG. 8). Referring to FIG. 8, the negative plate 102 includes a negative pattern 200 formed on its second side 182. As illustrated in FIG. 8, the negative plate 102 is oriented with its corner C1 positioned in an upper right position when the second side 182 is facing forwardly (or toward the first end cap 146 illustrated in FIGS. 3-4B, 16, 23, and 24). The negative pattern 200 includes four lines 201-204 that extend from the through-holes 171-174, respectively, to the through-hole 175. In the embodiment illustrated, the lines 201-204 intersect at a point on the edge of the through-hole 175. The lines 201-204 induce flow toward the through-hole 175 in a second flow direction identified by an arrow A2. Each of the lines 201-204 may be formed as a continuous line or by a plurality of through-holes arranged in a series to define the line. The plurality of through-holes may each have a diameter of about 1 mm to about 2 mm. When the plurality of through-holes are used to define the lines 191-194 (see FIG. 7) on the first side 180, the plurality of through-holes also define the lines 201-204 on the second side 182. Thus, the positive plate 101 (see FIG. 7) and the negative plate 102 may simply be mirror images of one another.

As mentioned above, each of the first neutral plates 142-N1, 142-N3, 142-N5, 142-N7, 142-N9, and 142-N11 may be implemented as the first neutral plate 103 (see FIG. 9). Referring to FIG. 9, the first neutral plate 103 includes a first neutral pattern 210 formed on its first side 180. The first neutral plate 103 is oriented with its corner C1 positioned in a lower right position when the first side 180 is facing forwardly (or toward the first end cap 146 illustrated in FIGS. 3-4B, 16, 23, and 24). The first neutral pattern 210 includes six lines 211-216. The lines 213-216 extend outwardly from a first intersection point 217. By way of non-limiting examples, the first intersection point 217 may be positioned about 2.0 cm above the edge E1 and about 4.8 cm away from the edge E4. The lines 215 and 216 extend outwardly from the first intersection point 217 and form a V-shape. The line 216 extends from the first intersection point 217 to the through-hole 175. The line 216 may extend through the through-hole 175 and to the edge E4 or may terminate between the through-hole 175 and the edge E4. The lines 213 and 214 extend from the first intersection point 217 to the through-holes 173 and 174, respectively. The line 215 extends from the first intersection point 217 to a termination point 218. By way of non-limiting examples, the termination point 218 may be positioned about 4.5 cm above the edge E1 and about 1.5 cm away from the edge E2. The lines 211 and 212 extend from the line 215 to the through-holes 171 and 172, respectively. The lines 211 and 212 may each be substantially parallel to the edges E2 and E4. The lines 211-216 induce an upward flow toward the through-holes 171-174 in a third flow direction identified by an arrow A3. The third flow direction may be substantially parallel to the edges E2 and E4. Each of the lines 211-216 may be formed as a continuous line or by a plurality of through-holes arranged in a series to define the line. The plurality of through-holes may each have a diameter of about 1 mm to about 2 mm.

As mentioned above, each of the second neutral plates 142-N2, 142-N4, 142-N6, 142-N8, 142-N10, and 142-N12 may be implemented as the second neutral plate 104 (see FIG. 10). Referring to FIG. 10, the second neutral plate 104 includes a second neutral pattern 220 formed on its second side 182. The second neutral plate 104 is oriented with its corner C1 positioned in a lower left position when the second side 182 is facing forwardly (or toward the first end cap 146 illustrated in FIGS. 3-4B, 16, 23, and 24). The second neutral pattern 220 includes six lines 221-226. The lines 223, 225, and 226 extend outwardly from a second intersection point 227. By way of non-limiting examples, the second intersection point 227 may be positioned about 2.0 cm above the edge E1 and about 4.8 cm away from the edge E4. The lines 225 and 226 extend outwardly from the second intersection point 227 and form a V-shape. The line 226 extends from the second intersection point 227 to the through-hole 175. The line 226 may extend through the through-hole 175 and to the edge E4 or may terminate between the through-hole 175 and the edge E4. The line 223 extends from the second intersection point 227 to the through-hole 173. The line 225 extends from the second intersection point 227 to the edge E2. The lines 221 and 222 extend from the line 225 to the through-holes 171 and 172, respectively. The lines 221 and 222 may each be substantially parallel to the edges E2 and E4. The line 224 extends from the line 226 to the through-holes 174. The line 224 intersects the line 226 at a location between the second intersection point 227 and the through-hole 175. The lines 221-226 induce an upward flow toward the through-holes 171-174 in a fourth flow direction identified by an arrow A4. The fourth flow direction may be substantially parallel to the edges E2 and E4. Each of the lines 221-226 may be formed as a continuous line or by a plurality of through-holes arranged in a series to define the line. The plurality of through-holes may each have a diameter of about 1 mm to about 2 mm. When the plurality of through-holes are used to define the lines 211-216 (see FIG. 7) on the first side 180, the plurality of through-holes also define the lines 221-226 on the second side 182. Thus, the first neutral plate 103 (see FIG. 9) and the second neutral plate 104 may simply be mirror images of one another.

Figure 11:
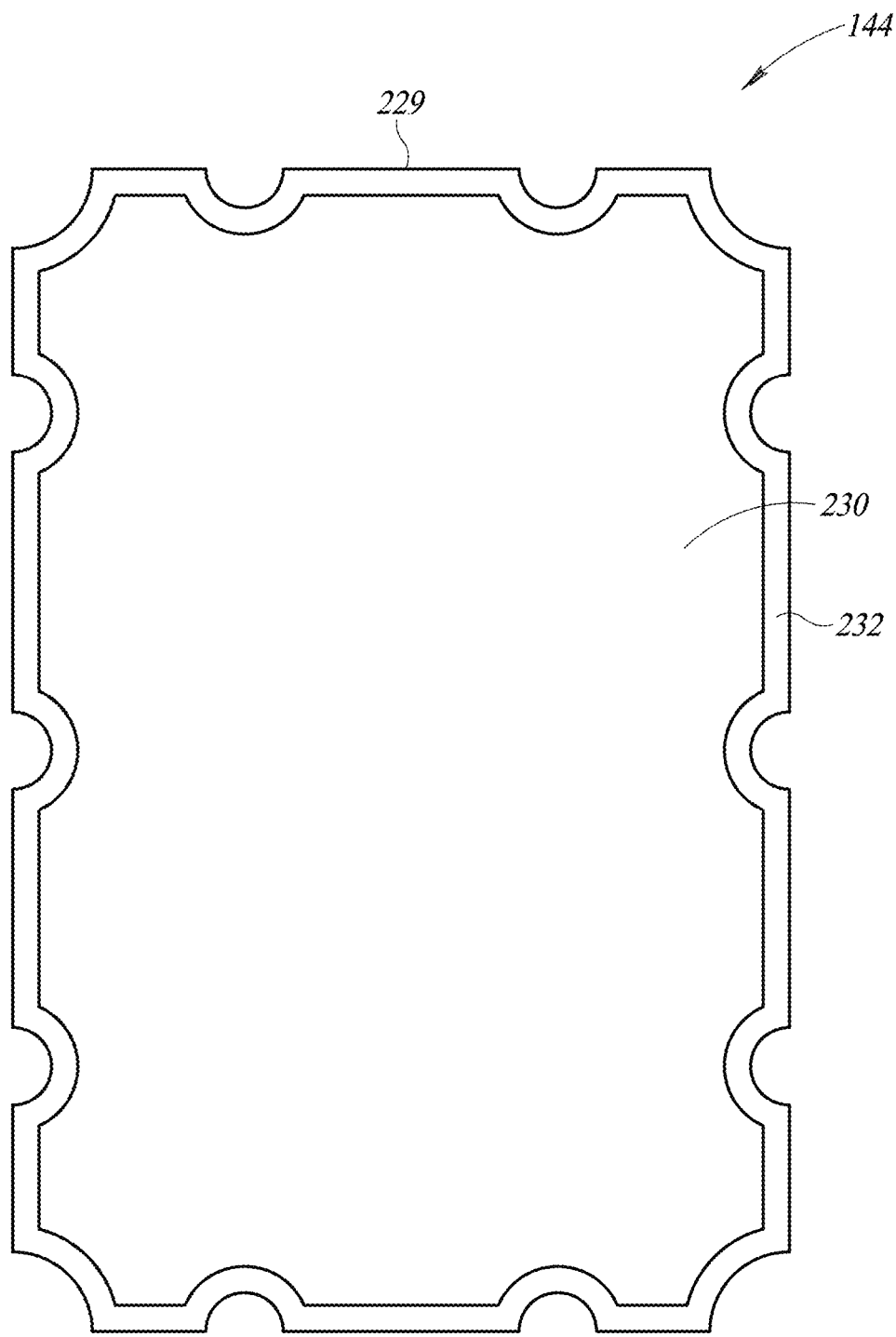
FIG. 11 is a back view of a seal of the hydrogen generator of FIG. 3.

A first embodiment of the seals 144 is illustrated in FIGS. 4A, 5, and 11. In the embodiment illustrated, each of the seals 144 is generally planar. Referring to FIG. 4A, the seals 144 help define a sealed internal chamber 228 inside the cell 140A. The sealed internal chamber 228 may be characterized as being an electrolysis chamber because the plates 142 split the water (see FIGS. 1-3) inside the sealed internal chamber 228. Referring to FIG. 11, each of the seals 144 has a peripheral portion 229 that defines an interior shape 230, which is closed along the peripheral portion 229 of the seal. Referring to FIG. 5, each of the seals 144 has a front side 231 opposite a back side 232. The interior shape 230 (see FIGS. 11 and 21) is open along both the front and back sides 231 and 232. Referring to FIG. 4A, an interstitial space 234 is defined between each adjacent pair of plates within the series of plates 142. One of the seals 144 is positioned within each of the interstitial spaces 234. For example, one of the seals 144 is positioned in the interstitial space 234 defined between the plates 142-PA and 142-N1. The seals 144 are configured such that the through-holes 171-175 (see FIGS. 6-10) of each of the plates 142 are positioned within the interior shape 230 (see FIGS. 11 and 21) of any of the seals 144 positioned alongside the plate. Thus, the interior shapes 230 (see FIGS. 11 and 21) of the seals 144 are interconnected inside the cell 140A by one or more of the through-holes 170 (see FIGS. 6-10, 12-15, and 17-20) and define the sealed internal chamber 228.

Referring to FIG. 4B, an interstitial space 236 may be defined between the first end cap 146 and the positive plate 142-PA. One of the seals 144, identified with reference numeral 144A, may be positioned in the interstitial space 236. The seal 144A is positioned such that the through-holes 171-175 (see FIGS. 6-10) of the positive plate 142-PA are positioned within the interior shape 230 (see FIGS. 11 and 21) of the seal 144A. Thus, the interior shape 230 (see FIGS. 11 and 21) of the seal 144A may be considered to be part of the sealed internal chamber 228.

Similarly, an interstitial space 238 may be defined between the second end cap 148 and the negative plate 142-NB. One of the seals 144, identified with reference numeral 144B in FIG. 5, may be positioned in the interstitial space 238. The seal 144B (see FIG. 5) is positioned such that the through-holes 171-175 (see FIGS. 6-10) of the negative plate 142-NB are positioned within the interior shape 230 (see FIGS. 11 and 21) of the seal 144B. Thus, the interior shape 230 (see FIGS. 11 and 21) of the seal 144B (see FIG. 5) may be considered to be part of the sealed internal chamber 228.

Referring to FIG. 4A, the seals 144 are substantially electrically non-conductive, and electrically isolate the plates 142 from one another. Thus, within the cell 140A, current flows between the plates 142 through the water 116 (see FIGS. 1-3). By way of a non-limiting example, the seals 144 may each be constructed from styrene-butadiene rubber ("SBR"), silicone, and the like.

As is apparent to those of ordinary skill in the art, the hydrogen gas 120 (see FIG. 2) will collect along the negative plates 142-NA and 142-NB and the oxygen gas 121 (see FIG. 2) will collect along the positive plates 142-PA and 142-PB. Referring to FIG. 3, the hydrogen and oxygen gases 120 and 121 (see FIG. 2) are both lighter than the water 116 and collect near the top of the sealed internal chamber 228 (see FIGS. 4A and 4B). Additionally, the hydrogen gas 120 (see FIG. 2) is lighter than the oxygen gas 121 (see FIG. 2). Thus, the hydrogen gas 120 (see FIG. 2) may collect nearer the top of the sealed internal chamber 228 (see FIGS. 4A and 4B) than the oxygen gas 121 (see FIG. 2). Each of the flows identified by the arrows A1-A4 in FIGS. 7-10, respectively, may be directed toward the near the top of the sealed internal chamber 228 (see FIGS. 4A and 4B).

Referring to FIG. 4A, the cell 140A has at least one water inlet, such as a water inlet 240, through which the water 116 (see FIGS. 1-3) enters the sealed internal chamber 228 of the cell 140A. In the embodiment illustrated, the water inlet 240 is formed in the first end cap 146. Thus, the water inlet 240 is in fluid communication with the sealed internal chamber 228. The water 116 (see FIGS. 1-3) flows from the water inlet 240 toward the second end cap 148. The water 116 (see FIGS. 1-3) flows through the through-holes 170 (see FIGS. 6-10, 12-15, and 17-20) in the plates 142 and into the interior shapes 230 (see FIGS. 11 and 21) of the seals 144 (see FIGS. 4A, 5, and 11) positioned between each adjacent pair of plates. The first end cap 146 includes a plurality of through-holes 242 (see FIG. 4B) through which the ties 152 may extend.

The cell 140A has at least one hydrogen outlet, such as a hydrogen outlet 244, through which the hydrogen gas 120 (see FIG. 2) exits the sealed internal chamber 228 of the cell 140A (e.g., and enters the hydrogen gas line(s) 128 illustrated in FIGS. 1 and 3). In the embodiment illustrated, the hydrogen outlet 244 is formed in second end cap 148. Thus, the hydrogen outlet 244 is in fluid communication with the sealed internal chamber 228. The hydrogen gas 120 (see FIG. 2) flows from the negative plates 142-NA and 142-NB toward the second end cap 148. Like the water 116 (see FIGS. 1-3), the hydrogen gas 120 (see FIG. 2) flows through the through-holes 170 (see FIGS. 6-10, 12-15, and 17-20) in the plates 142 and into the interior shapes 230 (see FIGS. 11 and 21) of the seals 144 positioned between each adjacent pair of plates. By way of a non-limiting example, the hydrogen outlet 244 may be threaded with ¼ National Pipe Thread Taper ("NPT") threads configured to receive a 10 mm quick connector. The oxygen gas 121 (see FIG. 2) may exit through the hydrogen outlet 244 or be vented into the surrounding environment via one or more check valves (not shown) formed in the second end cap 148. The second end cap 148 includes a plurality of through-holes 246 (see FIG. 4B) through which the ties 152 may extend. The first and second end caps 146 and 148 are each constructed from a substantially electrically non-conductive material. By way of a non-limiting example, the first and second end caps 146 and 148 may be constructed from plastic (e.g., nylon, acrylonitrile Butadiene Styrene ("ABS"), etc.) and the like.

Referring to FIG. 3, the positive terminal T+ of the power controller 108 is connected (e.g., by one of the conductors 110) to the positive plates 142-PA and 142-PB (see FIGS. 4A-5). Referring to FIG. 4B, in the embodiment illustrated, an optional positive conductor 250 (e.g., a bolt) is inserted through the optional through-hole 178 (see FIGS. 6-10, 12-15, and 17-20) of the positive plates 142-PA and 142-PB. Referring to FIG. 3, the positive terminal T+ of the power controller 108 is connected (e.g., by one of the conductors 110) to the positive conductor 250. Referring to FIG. 4A, the cutout 161B (see FIG. 6) of the negative plates 142-NA and 142-NB prevents the positive conductor 250 from contacting the negative plates 142-NA and 142-NB. Similarly, referring to FIG. 5, the cutout 161C (see FIG. 6) of the neutral plates 142-N1, 142-N3, 142-N5, 142-N7, 142-N9, and 142-N11 prevents the positive conductor 250 (see FIGS. 3-4B) from contacting the neutral plates 142-N1, 142-N3, 142-N5, 142-N7, 142-N9, and 142-N11. Additionally, the cutout 161D (see FIG. 6) of the neutral plates 142-N2, 142-N4, 142-N6, 142-N8, 142-N10, and 142-N12 prevents the positive conductor 250 (see FIGS. 3-4B) from contacting the neutral plates 142-N2, 142-N4, 142-N6, 142-N8, 142-N10, and 142-N12.

Referring to FIG. 3, the negative terminal T− of the power controller 108 is connected to the negative plates 142-NA and 142-NB (see FIGS. 4A-5). Referring to FIG. 4A, in the embodiment illustrated, an optional negative conductor 252 (e.g., a bolt) is inserted through the through-hole 178 (see FIGS. 6-10, 12-15, and 17-20) of the negative plates 142-NA and 142-NB. Referring to FIG. 3, the negative terminal T− of the power controller 108 is connected to the negative conductor 252 (e.g., by one of the conductors 110). Referring to FIG. 4A, the cutout 161B (see FIG. 6) of the positive plates 142-PA and 142-PB prevents the negative conductor 252 from contacting the positive plates 142-PA and 142-PB. Similarly, referring to FIG. 5, the cutout 161D (see FIG. 6) of the neutral plates 142-N1, 142-N3, 142-N5, 142-N7, 142-N9, and 142-N11 prevents the negative conductor 252 from contacting the neutral plates 142-N1, 142-N3, 142-N5, 142-N7, 142-N9, and 142-N11. Additionally, the cutout 161C (see FIG. 6) of the neutral plates 142-N2, 142-N4, 142-N6, 142-N8, 142-N10, and 142-N12 prevents the negative conductor 252 from contacting the neutral plates 142-N2, 142-N4, 142-N6, 142-N8, 142-N10, and 142-N12.

Referring to FIG. 4A, the water 116 (see FIGS. 1-3) inside the cell 140A connects the positive plates 142-PA and 142-PB and the negative plates 142-NA and 142-NB to form a circuit. Referring to FIG. 3, the flow of current through the water 116 causes the water molecules 117 (see FIG. 2) to split into the hydrogen atoms 118 (see FIG. 2) and the oxygen atoms 119 (see FIG. 2). In other words, the electrolysis performed by the cell 140A is powered by the power controller 108.

Referring to FIG. 5, optionally, a first ground conductor (not shown) may be inserted through the through-hole 178 (see FIGS. 6-10, 12-15, and 17-20) of the first neutral plates 142-N1, 142-N3, 142-N5, 142-N7, 142-N9, and 142-N11. Similarly, a second ground conductor (not shown) may be inserted through the through-hole 178 (see FIGS. 6-10, 12-15, and 17-20) of the second neutral plates 142-N2, 142-N4, 142-N6, 142-N8, 142-N10, and 142-N12. The first and second ground conductors (not shown) may each be connected to ground and do not contact either the positive plates 142-PA and 142-PB or the negative plates 142-NA and 142-NB.

Thus, the cell 140A (see FIGS. 1 and 3-4B) may be configured as follows:

1. the positive plate 142-PA oriented with its through-hole 178 (see FIGS. 6-10, 12-15, and 17-20) positioned top left and connected to the positive conductor 250 (see FIG. 3-4B);
2. the neutral plates 142-N1 to 142-N4 (optionally, the first neutral plates 142-N1 and 142-N3 may be connected to the first ground conductor (not shown) and the second neutral plates 142-N2 and 142-N4 may be connected to the second ground conductor (not shown));
3. the negative plate 142-NA oriented with its through-hole 178 positioned top right and connected to the negative conductor 252;
4. the neutral plates 142-N5 to 142-N8 (optionally, the first neutral plates 142-N5 and 142-N7 may be connected to the first ground conductor (not shown) and the second neutral plates 142-N6 and 142-N8 may be connected to the second ground conductor (not shown));
5. the positive plate 142-PB oriented with its through-hole 178 positioned top left and connected to the positive conductor 250;
6. the neutral plates 142-N9 to 142-N12 (optionally, the first neutral plates 142-N9 and 142-N11 may be connected to the first ground conductor (not shown) and the second neutral plates 142-N10 and 142-N12 may be connected to the second ground conductor (not shown)); and
7. the negative plate 142-NB oriented with its through-hole 178 positioned top right and connected to the negative conductor 252.

The positive plates 142-PA and 142-PB create an electric arc with the negative plates 142-NA and 142-NB that is driven by the water 116 (see FIGS. 1-3). The neutral plates 142-N1 to 142-N12 create resistance between the positive plates 142-PA and 142-PB and the negative plates 142-NA and 142-NB and increase the flow of current (e.g., measured in amperes).

Referring to FIG. 4A, in the embodiment illustrated, the ties 152 (e.g., threaded rods) are configured to connect the first and second end caps 146 and 148 together with the plates 142 and seals 144 positioned therebetween. The ties 152 extend alongside and substantially perpendicular to the edges E1-E4 (see FIG. 6) of the plates 142. Referring to FIG. 6, the cutouts 162A and 162B on the edges E1 and E3 and the cutouts 163A-163C on the edges E2 and E4 are each configured to receive a portion of a different one of the ties 152 (see FIGS. 3-4B). Referring to FIG. 4A, the ties 152 may be constructed from a substantially electrically non-conductive material or may be wrapped in a substantially electrically non-conductive material 153. Thus, the ties 152 do not conduct electricity between the plates 142. The ties 152 help prevent the plates 142 from moving inside the cell 140A and help maintain their positioning inside the cell 140A. The seals 144 are each positioned inwardly of the ties 152, which do not extend through the closed interior shapes 230 (see FIGS. 11 and 21) of the seals 144.

The ties 152 are configured to compress the seals 144 inside the cell 140A to help ensure that the water 116 (see FIGS. 1-3) and/or the hydrogen gas 120 (see FIG. 2) does not leak from the cell 140A. In the embodiment illustrated, the ties 152 have been implemented as threaded rods surrounded by the substantially electrically non-conductive material 153. The fasteners 154 (e.g., nuts) are threaded onto the ends of the threaded rods alongside each of the first and second end caps 146 and 148. By tightening the fasteners 154, sufficient pressure may be applied to the first and second end caps 146 and 148 to compress the seals 144 and prevent leakage.

As mentioned above, referring to FIG. 1, the water 116 may include the catalyst 122 (e.g., potassium hydroxide), which reacts with the electricity and increases the flow of current (e.g., measured in amperes). Referring to FIG. 2, increasing the current splits more of the water molecules 117 into the hydrogen and oxygen atoms 118 and 119. Referring to FIG. 3, by way of a non-limiting example, the cell 140A may be configured to generate about 1.3 liters per minute of hydrogen gas. Referring to FIG. 1, if the hydrogen consuming process and/or device 134 requires less hydrogen, the excess hydrogen may simply be vented to the outside environment. By not storing the excess hydrogen, the system 100 avoids potential explosion risks associated with storing hydrogen.

Referring to FIG. 4A, in alternate embodiments, different numbers of neutral plates may be positioned between the positive and negative plates 101 (see FIG. 7) and 102 (see FIG. 8) of the cell 140A. For example, the cell 140A may include fifteen neutral plates and be configured as follows:
1. a first positive plate (like the positive plate 101 illustrated in FIG. 7);
2. a first neutral plate (like the first neutral plate 103 illustrated in FIG. 9);
3. a second neutral plate (like the second neutral plate 104 illustrated in FIG. 10);
4. a third neutral plate (like the first neutral plate 103 illustrated in FIG. 9);
5. a fourth neutral plate (like the second neutral plate 104 illustrated in FIG. 10);
6. a fifth neutral plate (like the first neutral plate 103 illustrated in FIG. 9);
7. a first negative plate (like the negative plate 102 illustrated in FIG. 8);
8. a sixth neutral plate (like the first neutral plate 103 illustrated in FIG. 9);
9. a seventh neutral plate (like the second neutral plate 104 illustrated in FIG. 10);
10. an eighth neutral plate (like the first neutral plate 103 illustrated in FIG. 9);
11. a ninth neutral plate (like the second neutral plate 104 illustrated in FIG. 10);
12. a tenth neutral plate (like the first neutral plate 103 illustrated in FIG. 9);
13. a second positive plate (like the positive plate 101 illustrated in FIG. 7);
14. an eleventh neutral plate (like the first neutral plate 103 illustrated in FIG. 9);
15. a twelfth neutral plate (like the second neutral plate 104 illustrated in FIG. 10);
16. a thirteenth neutral plate (like the first neutral plate 103 illustrated in FIG. 9);
17. a fourteenth neutral plate (like the second neutral plate 104 illustrated in FIG. 10);
18. a fifteenth neutral plate (like the first neutral plate 103 illustrated in FIG. 9);
19. a second negative plate (like the negative plate 102 illustrated in FIG. 8).

Again, the two positive plates (each like the positive plate 101 illustrated in FIG. 7) create electric arcs with the two negative plates (each like the negative plate 102 illustrated in FIG. 8) that is driven by the water 116 (see FIGS. 1-3). The fifteen neutral plates create resistance between the positive plates and the negative plates and increase the flow of current.

High-Density Embodiment

FIGS. 12-15 illustrate second embodiments of the plates 142 (see FIGS. 3-6, 16, and 23) that may be used to construct a high-density version of the cell 140A (see FIGS. 1 and 3-4B). The high-density version may be used to supply hydrogen to a flame consuming a very high number of calories (e.g., a furnace, an industrial oven, and the like). Oxygen produced by the high-density version may be combined with the hydrogen to increase the heat output of the flame.

In FIGS. 12-15, the through-holes 170 include only the through-holes 171 and 175. In other words, the through-holes 172-174 are omitted. FIGS. 12-15 illustrate plates 301-304, respectively.

Figure 12:
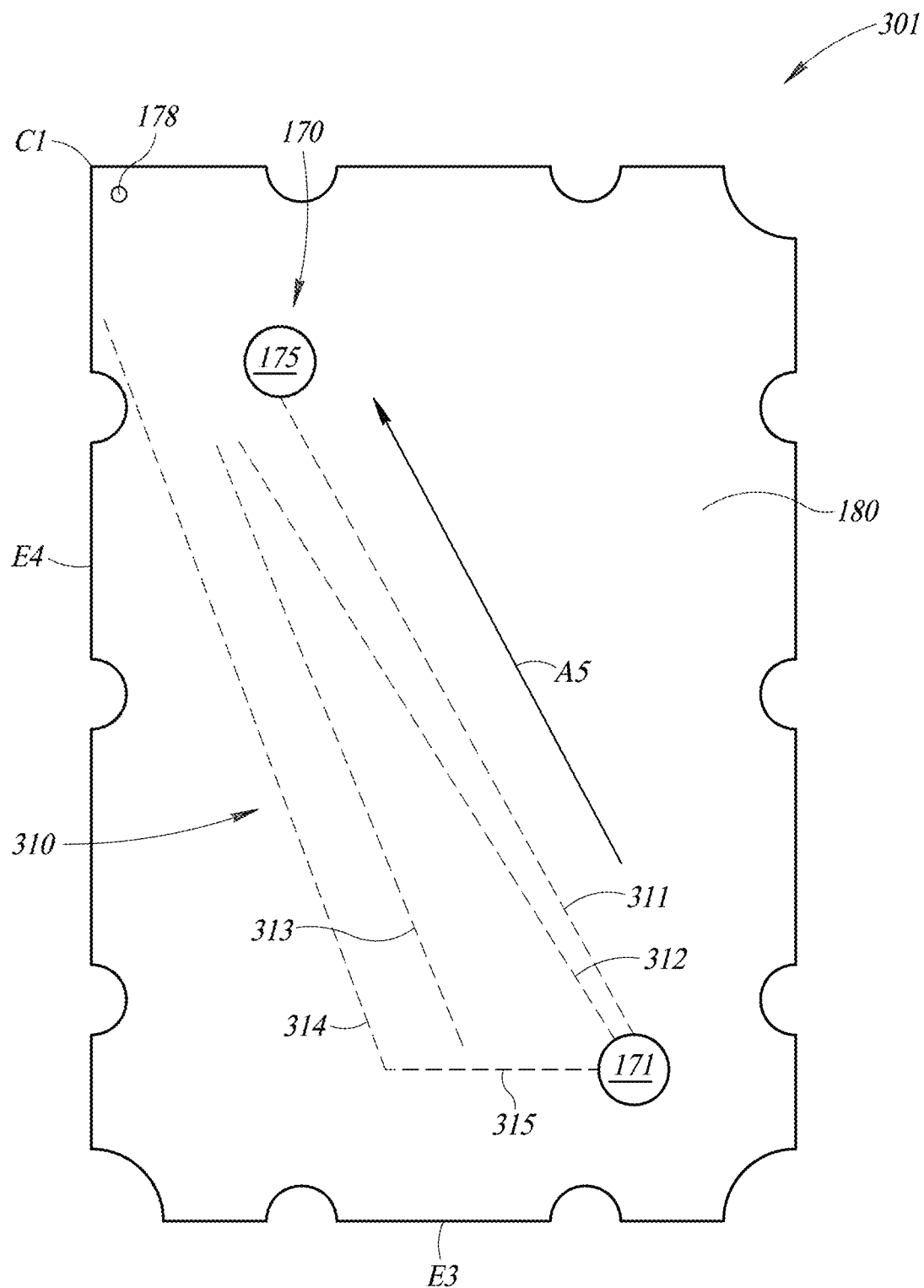
FIG. 12 is a view of a first side of a second embodiment of the positive plate of the hydrogen generator of FIG. 3.

Referring to FIG. 12, the positive plate 301 may be used to construct the cell 140A (see FIGS. 1 and 3-4B) instead and in place of the positive plate 101 (see FIG. 7). The positive plate 301 includes a positive pattern 310 instead of the positive pattern 190 (see FIG. 7). The positive pattern 310 is formed on the first side 180 of the positive plate 301. The positive plate 301 is oriented with the corner C1 positioned in the upper left position when the first side 180 is facing forwardly (or toward the first end cap 146 illustrated in FIGS. 3-4B, 16, 23, and 24). The positive pattern 310 includes five lines 311-315. The line 311 extends from the through-hole 171 to the through-hole 175 and the line 312 extends from the through-hole 171 to a first location near the through-hole 175. The line 315 extends outwardly from the through-hole 171 in a direction substantially parallel with the edge E3. The line 313 extends from the line 315 to a second location near the through-hole 175 and spaced apart from the first location. The line 314 extends from the line 315 to the edge E4. The lines 311-315 are configured to induce flow toward the through-hole 175 in a fifth flow direction identified by an arrow A5. Each of the lines 311-315 may be formed as a continuous line or by a plurality of through-holes arranged in a series to define the line. The plurality of through-holes may each have a diameter of about 1 mm to about 2 mm.

Figure 13:
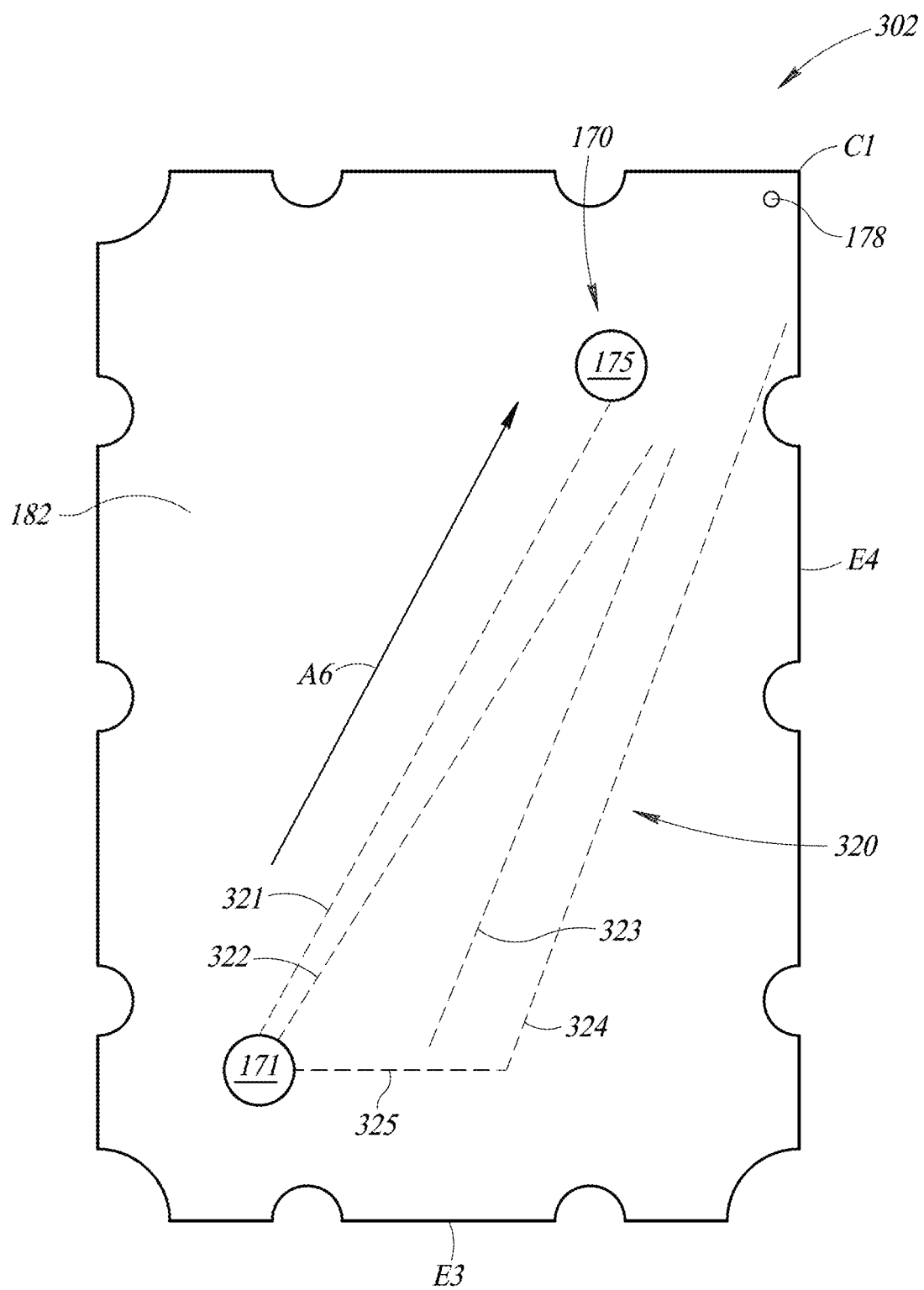
FIG. 13 is a view of a second side of a second embodiment of the negative plate of the hydrogen generator of FIG. 3.

Referring to FIG. 13, the negative plate 302 may be used to construct the cell 140A (see FIGS. 1 and 3-4B) instead and in place of the negative plate 102 (see FIG. 8). The negative plate 302 includes a negative pattern 320 instead of the negative pattern 200 (see FIG. 8). The negative pattern 320 is formed on the second side 182 of the negative plate 302. The negative pattern 320 is oriented with the corner C1 positioned in the upper right position when the second side 182 is facing forwardly (or toward the first end cap 146 illustrated in FIGS. 3-4B, 16, 23, and 24). The negative pattern 320 includes five lines 321-325. The line 321 extends from the through-hole 171 to the through-hole 175 and the line 322 extends from the through-hole 171 to a first location near the through-hole 175. The line 325 extends outwardly from the through-hole 171 in a direction substantially parallel with the edge E3. The line 323 extends from the line 325 to a second location near the through-hole 175 and spaced apart from the first location. The line 324 extends from the line 325 to the edge E4. Each of the lines 321-325 may be formed as a continuous line or by a plurality of through-holes arranged in a series to define the line. The plurality of through-holes may each have a diameter of about 1 mm to about 2 mm. The lines 321-325 are configured to induce flow toward the through-hole 175 in a sixth flow direction identified by an arrow A6. When the plurality of through-holes are used to define the lines 311-315 (see FIG. 12) on the first side 180, the plurality of through-holes also define the lines 321-325 on the second side 182. Thus, the positive plate 301 (see FIG. 12) and the negative plate 302 may simply be mirror images of one another.

Figure 14:
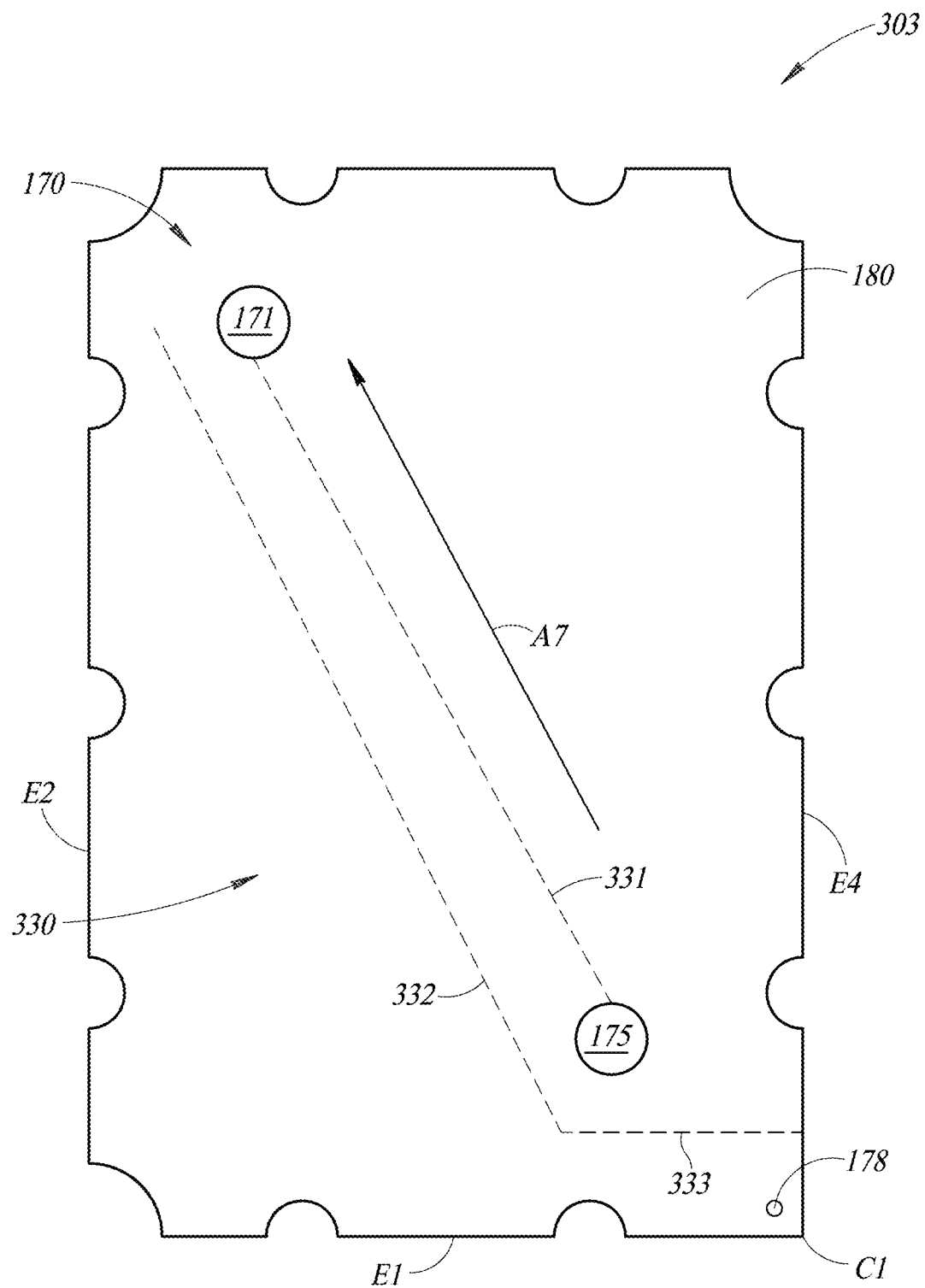
FIG. 14 is a view of a first side of a second embodiment of the first neutral plate of the hydrogen generator of FIG. 3.

Referring to FIG. 14, the first neutral plate 303 may be used to construct the cell 140A (see FIGS. 1 and 3-4B) instead and in place of the first neutral plate 103 (see FIG. 9). The first neutral plate 303 includes a first neutral pattern 330 instead of the first neutral pattern 210 (see FIG. 9). The first neutral pattern 330 is formed on the first side 180 of the first neutral plate 303. The first neutral plate 303 is oriented with the corner C1 positioned in the lower right position when the first side 180 is facing forwardly (or toward the first end cap 146 illustrated in FIGS. 3-4B, 16, 23, and 24). The first neutral pattern 330 includes three lines 331-333. The line 331 extends from the through-hole 171 to the through-hole 175. The line 333 extends inwardly from the edge E4 in a direction substantially parallel with the edge E1. The line 333 terminates near the through-hole 175. The line 332 extends from the line 333 to the edge E2 or to a location near the through-hole 175. The lines 331-333 are configured to induce flow toward the through-hole 171 in a seventh flow direction identified by an arrow A7. Each of the lines 331-333 may be formed as a continuous line or by a plurality of through-holes arranged in a series to define the line. The plurality of through-holes may each have a diameter of about 1 mm to about 2 mm.

Figure 15:
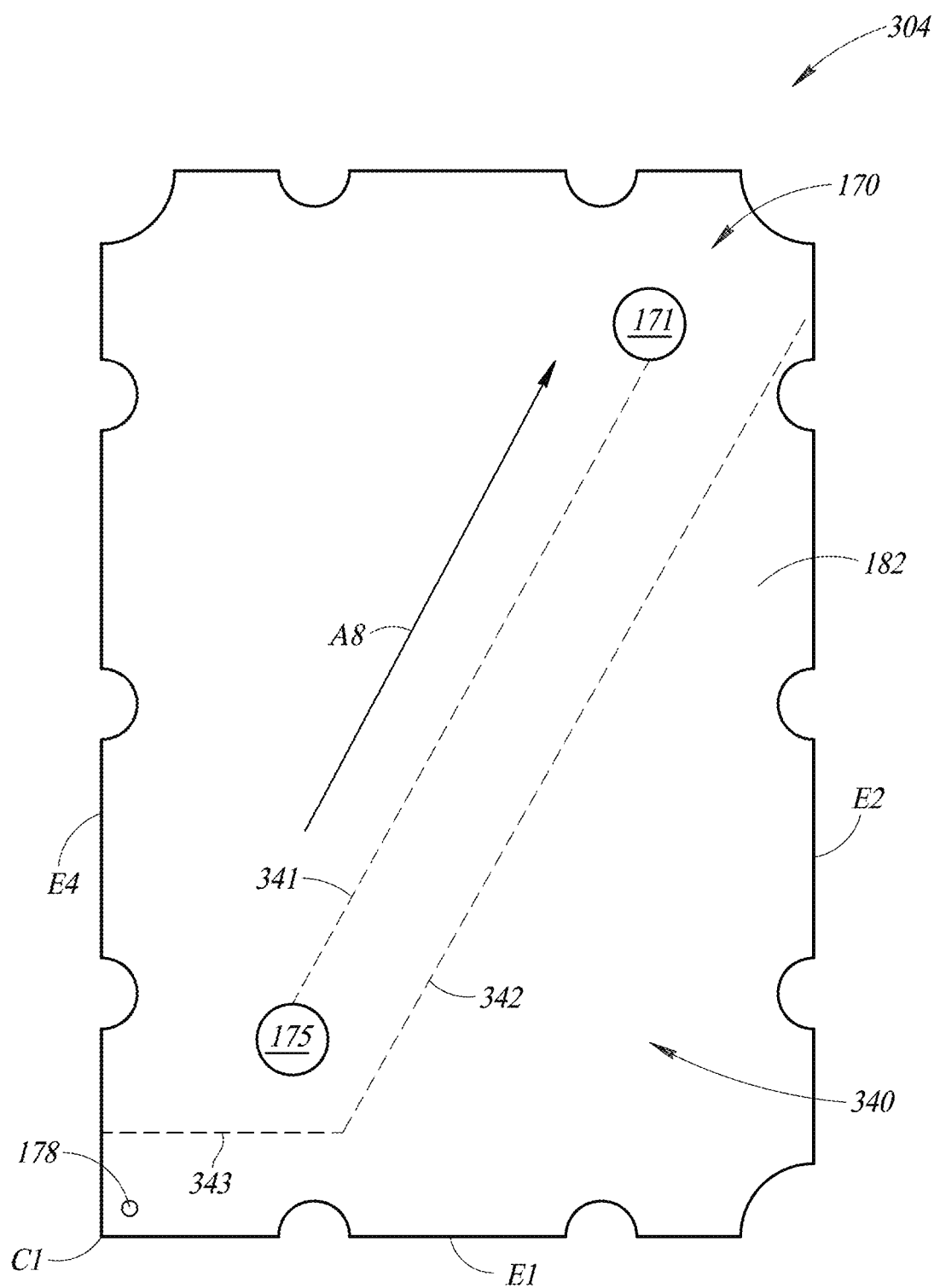
FIG. 15 is a view of a second side of a second embodiment of the second neutral plate of the hydrogen generator of FIG. 3.

Referring to FIG. 15, the second neutral plate 304 may be used to construct the cell 140A (see FIGS. 1 and 3-4B) instead and in place of the second neutral plate 104 (see FIG. 10). The second neutral plate 304 includes a second neutral pattern 340 instead of the second neutral pattern 220 (see FIG. 10). The second neutral pattern 340 is formed on the second side 182 of the second neutral plate 304. The second neutral plate 304 is oriented with the corner C1 positioned in the lower left position when the second side 182 is facing forwardly (or toward the first end cap 146 illustrated in FIGS. 3-4B, 16, 23, and 24). The second neutral pattern 340 includes three lines 341-343. The line 341 extends from the through-hole 171 to the through-hole 175. The line 343 extends inwardly from the edge E4 in a direction substantially parallel with the edge E1. The line 343 terminates near the through-hole 175. The line 342 extends from the line 343 to the edge E2 or to a location near the through-hole 171. The lines 341-343 are configured to induce flow toward the through-hole 171 in an eighth flow direction identified by an arrow A8. Each of the lines 341-343 may be formed as a continuous line or by a plurality of through-holes arranged in a series to define the line. The plurality of through-holes may each have a diameter of about 1 mm to about 2 mm.

When the plurality of through-holes are used to define the lines 331-333 (see FIG. 14) on the first side 180, the plurality of through-holes also define the lines 341-343 on the second side 182. Thus, the first neutral plate 303 (see FIG. 9) and the second neutral plate 304 may simply be mirror images of one another.

Each of the flows identified by the arrows A5-A8 in FIGS. 12-15, respectively, may be directed toward the near the top of the sealed internal chamber 228 (see FIGS. 4A and 4B). In the positive and negative plates 301 and 302, the through-hole 171 may be characterized as being an entrance or inlet and the through-hole 175 may be characterized as being an exit or outlet. The fifth and sixth flow directions (identified by the arrows A5 and A6) each flow from the inlet (the through-hole 171) toward the outlet (the through-hole 175). In the first and second neutral plates 303 and 304, the through-hole 175 may be characterized as being an entrance or inlet and the through-hole 171 may be characterized as being an exit or outlet. The seventh and eighth flow directions (identified by the arrows A7 and A8) each flow from the inlet (the through-hole 175) toward the outlet (the through-hole 171). Referring to FIGS. 12-15, when the plates 301-304 are used to construct the cell 140A (see FIGS. 1 and 3-4B), the flows induced by the fifth, sixth, seventh, and eighth flow directions cause the water 116 (see FIGS. 1-3), the hydrogen gas 120 (see FIG. 2), and/or the oxygen gas 121 (see FIG. 2) to zig-zag through the cell 140A. Thus, fewer ones of the through-holes 170 are needed to create the desired flows.

Low-Density Embodiment

FIG. 16 is a perspective view of a cell 350 that is a low-density version of the cell 140A (see FIGS. 1 and 3-4B). The cell 350 may be used to supply hydrogen to a low-density application, such as a flame consuming a low number of calories (e.g., a residential oven, a lamp, and the like). Oxygen produced by the low-density version may be vented to the atmosphere. Like the cell 140A (see FIGS. 1 and 3-4B), the cell 350 includes the plates 142 but the seals 144 are replaced with seals 352 (see FIGS. 21 and 23) and membranes 354 (see FIG. 22). In the embodiment illustrated, the water inlet 240 (see FIGS. 4A and 4B), the hydrogen outlet 244 (see FIGS. 4A, 4B, 23, and 24), and a separate oxygen outlet 362 (see FIGS. 23 and 24) are formed in the second end cap 148. In alternate embodiments, the second end cap 148 may include two or more separate water inlets that are each like the water inlet 240 (see FIGS. 4A and 4B) and connected to the water source 112 (see FIGS. 1 and 3) by the water line(s) 114 (see FIGS. 1 and 3). In alternate embodiments, the first end cap 146 may include the water inlet 240 (see FIGS. 4A and 4B) or two or more separate water inlets that are each like the water inlet 240 and connected to the water source 112 (see FIGS. 1 and 3) by the water line(s) 114 (see FIGS. 1 and 3). Optionally, referring to FIG. 23, the hydrogen outlet 244 may be positioned above the oxygen outlet 362. In the embodiment illustrated, the hydrogen outlet 244 and the oxygen outlet 362 are spaced apart from one another and arranged side-by-side.

Referring to FIG. 16, fittings 364-368 may be connected to the water inlet 240 (see FIGS. 4A and 4B), the hydrogen outlet 244 (see FIGS. 4A, 4B, 23, and 24), and the oxygen outlet 362 (see FIGS. 23 and 24), respectively. The fitting 364 is configured to be coupled to the water line(s) 114 (see FIGS. 1 and 3) and to supply the water 116 (see FIGS. 1-3) received therethrough from the water source 112 (see FIGS. 1 and 3) to a sealed interior 370 (see FIGS. 23 and 24) of the cell 350. The fitting 366 is configured to be coupled to the hydrogen gas line(s) 128 (see FIGS. 1 and 3) and to conduct the hydrogen gas 120 (see FIG. 2) produced by the cell 350 to the hydrogen reservoir 130 (see FIG. 1). The fitting 368 is configured to be coupled to the oxygen gas line(s) 138 (see FIG. 1) and to vent the oxygen gas 121 (see FIG. 2) produced by the cell 350 to the atmosphere.

FIGS. 17-20 illustrate plates 401-404, respectively, that together are a third embodiment of the plates 142 (see FIGS. 3-6, 16, and 23) and may be used to construct the cell 350 (see FIGS. 16, 23, and 24). As shown in FIGS. 17-20, none of the plates 401-404 includes a pattern of lines.

In FIGS. 17-20, the through-holes 170 include only the through-holes 171, 174, 175, and 176. In other words, the through-holes 172 and 173 are omitted. The through-hole 171 may be positioned directly below the through-hole 176 and directly across from the through-hole 174. The through-hole 175 may be positioned directly above the through-hole 174 and directly across from the through-hole 176. Thus, the through-holes 171, 174, 175, and 176 may be positioned at corners of rectangular shape.

Figure 17:
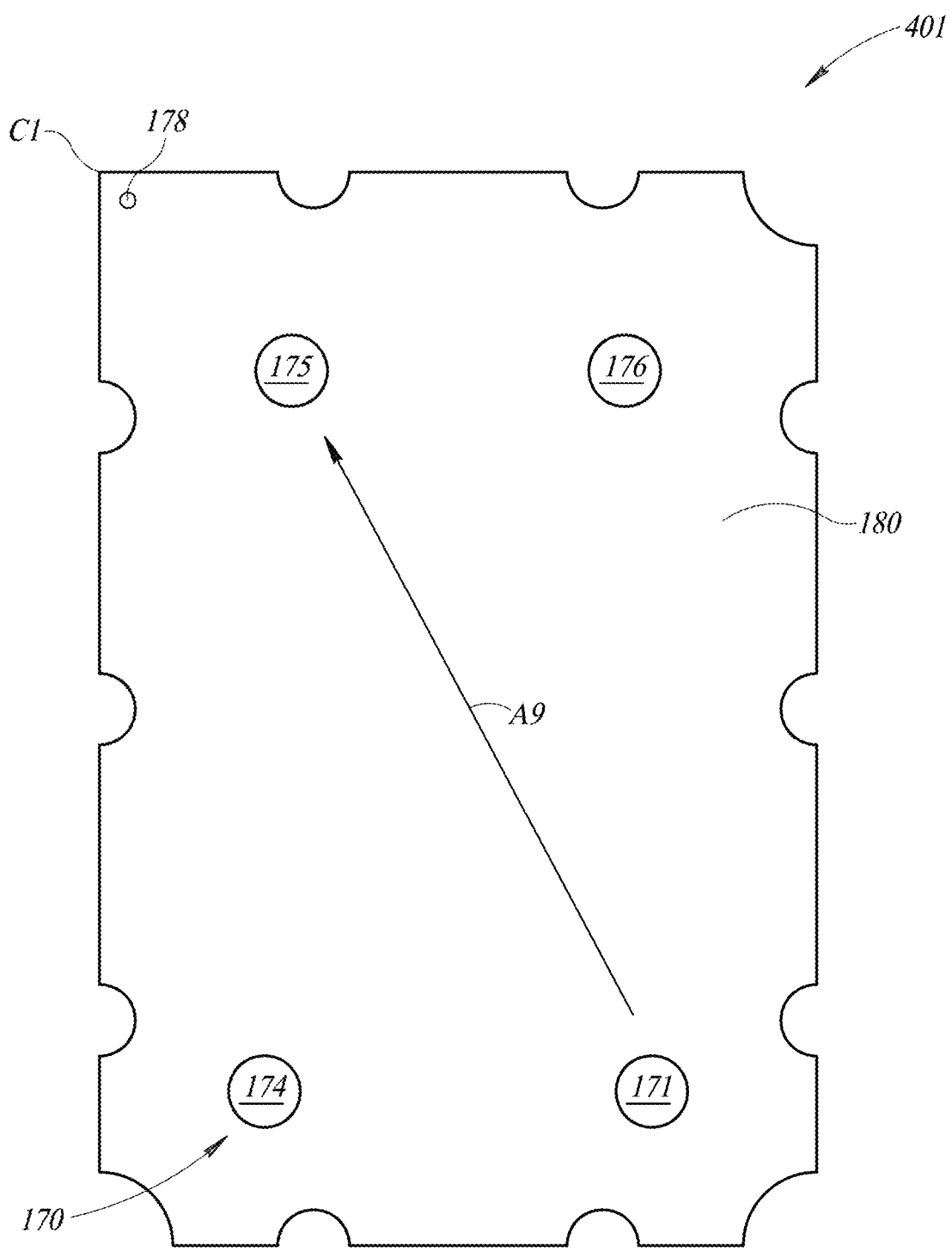
FIG. 17 is a view of a first side of a positive plate of the hydrogen generator of FIG. 16.

Referring to FIG. 17, the positive plate 401 is oriented with its corner C1 positioned in the upper left position when the first side 180 is facing forwardly (or toward the first end cap 146 illustrated in FIGS. 3-4B, 16, 23, and 24). A flow may be induced along the first side 180 toward the through-hole 175 in a ninth flow direction identified by an arrow A9. Referring to FIG. 3, the positive conductor 250 (e.g., a bolt) may be inserted through the through-hole 178 of the positive plate 401 (see FIG. 17) and connected (e.g., by one of the conductors 110) to the positive terminal T+ of the power controller 108. In this manner, the positive plate 401 (see FIG. 17) may be charged. Alternatively, one of the conductors 110 may direct couple the positive plate 401 (see FIG. 17) to the positive terminal T+ of the power controller 108.

Figure 18:
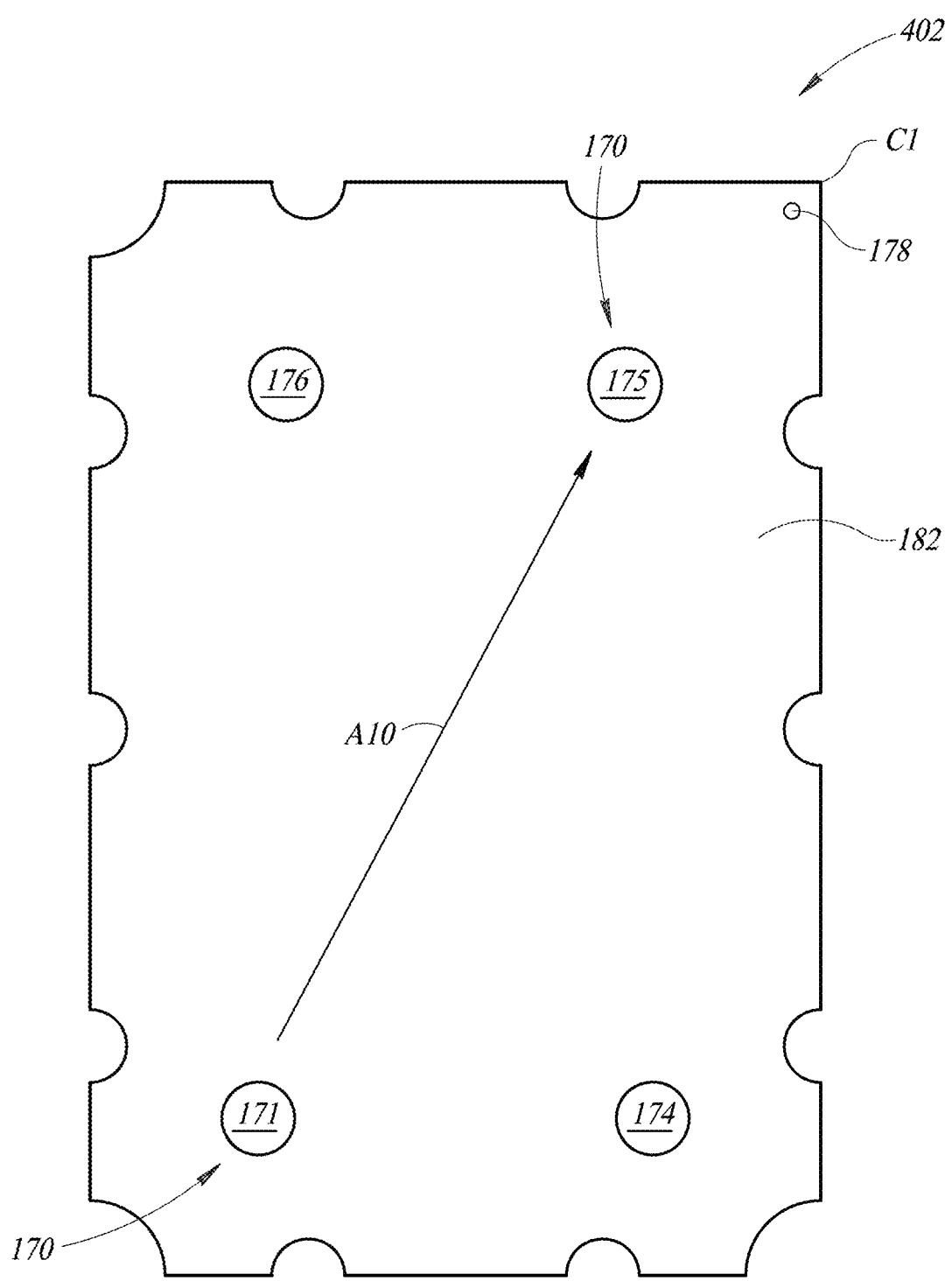
FIG. 18 is a view of a second side of a negative plate of the hydrogen generator of FIG. 16.

Referring to FIG. 18, the negative plate 402 is oriented with the corner C1 positioned in the upper right position when the second side 182 is facing forwardly (or toward the first end cap 146 illustrated in FIGS. 3-4B, 16, 23, and 24). A flow may be induced along the second side 182 toward the through-hole 175 in a tenth flow direction identified by an arrow A10. Referring to FIG. 3, the negative conductor 252 (e.g., a bolt) may be inserted through the through-hole 178 of the negative plate 402 (see FIGS. 18 and 23) and connected (e.g., by one of the conductors 110) to the negative terminal T− of the power controller 108. In this manner, the negative plate 402 (see FIGS. 18 and 23) may be charged. Alternatively, one of the conductors 110 may direct couple the negative plate 402 (see FIGS. 18 and 23) to the negative terminal T− of the power controller 108.

Referring to FIG. 19, the first neutral plate 403 is oriented with the corner C1 positioned in the lower right position when the first side 180 is facing forwardly (or toward the first end cap 146 illustrated in FIGS. 3-4B, 16, 23, and 24). A flow may be induced along the first side 180 toward the through-hole 171 in an eleventh flow direction identified by an arrow A11.

Referring to FIG. 20, the second neutral plate 404 is oriented with the corner C1 positioned in the lower left position when the second side 182 is facing forwardly (or toward the first end cap 146 illustrated in FIGS. 3-4B, 16, 23, and 24). A flow may be induced along the second side 182 toward the through-hole 171 in a twelfth flow direction identified by an arrow A12.

Referring to FIG. 21, the seals 352 are substantially similar to the seals 144 (see FIGS. 4A, 5, and 11). Thus, each of the seals 352 includes the peripheral portion 229 that defines the interior shape 230, which is closed along the peripheral portion 229 of the seal. Each of the seals 352 also has the front side 231 opposite the back side 232 (see FIGS. 5, 11, and 24). Further, each of the seals 352 may be generally planar. However, the seals 352 differ from the seals 144 (see FIGS. 4A, 5, and 11) because each of the seals 352 include first and second barriers 410 and 412 that define first and second sealed regions 420 and 422, respectively, within the interior shape 230. The first sealed region 420 is sealed by the first barrier 410 and the peripheral portion 229. The second sealed region 422 is sealed by the second barrier 412 and the peripheral portion 229. The first and second sealed regions 420 and 422 are positioned to isolate two of the through-holes 170 (see FIGS. 6-10, 12-15, and 17-20) of each of the plates 401-404 (see FIGS. 17-20, respectively) from a remainder 424 of the interior shape 230.

FIG. 22 illustrates one of the membranes 354. Each of the membranes 354 may be generally planar. As shown in FIG. 22, the membrane 354 may have the same general outer shape as the plates 142 (see FIGS. 3-6, 16, and 23). The membranes 354 each include through-holes 470 that correspond to the through-holes 170 (see FIGS. 6-10, 12-15, and 17-20) of the plates 401-404 illustrated in FIGS. 17-20, respectively. Thus, referring to FIG. 17, the through-holes 470 (see FIG. 22) each include through-holes 471 and 474-476 (see FIG. 22) that correspond to the through-holes 171 and 174-176, respectively. The through-holes 470 are configured to allow the water 116 (see FIGS. 1-3), the hydrogen gas 120 (see FIG. 2), and the oxygen gas 121 (see FIG. 2) to flow therethrough. Each of the membranes 354 is configured to be sandwiched between a pair of the seals 352 (see FIGS. 21 and 23) and to permit flow between the pair of seals only through the through-holes 470. By way of a non-limiting example, the membranes 354 (see FIG. 22) may each be constructed from vinyl or a similar material configured to block oxygen and hydrogen from flowing through the material.

FIG. 21 illustrates the seal 352 in a first orientation with its first and second sealed regions 420 and 422 positioned in the upper right hand and lower left hand corners, respectively. In this orientation, the front side 231 faces toward the first end cap 146 (see FIGS. 3-4B, 16, 23, and 24). The seal 352 may be positioned in a second orientation in which the front side 231 faces toward the second end cap 148 (see FIGS. 3-4B, 16, 23, and 24). In the second orientation, the first and second sealed regions 420 and 422 are positioned in the upper left hand and lower right hand corners, respectively. Table A below lists which of the through-holes 170 (see FIGS. 6-10, 12-15, and 17-20) of each of the plates 401-404 (see FIGS. 17-20, respectively) is positioned inside each of the first and second sealed regions 420 and 422 when the seal 352 is positioned alongside the plate in the first and second orientations. For example, when the seal 352 is positioned alongside the positive plate 401 (see FIG. 17) in the first orientation, the through-holes 176 and 174 are positioned inside the first and second sealed regions 420 and 422, respectively. On the other hand, when the seal 352 is positioned alongside the positive plate 401 (see FIG. 17) in the second orientation, the through-holes 175 and 171 are positioned inside the first and second sealed regions 420 and 422, respectively.

TABLE A

| | Orientation of Seal 352 | | | |
|---|---|---|---|---|
| | First Orientation (Shown in FIG. 21) | | Second Orientation | |
| | First sealed region 420 | Second sealed region 422 | First sealed region 420 | Second sealed region 422 |
| Positive plate 401 | through-hole 176 | through-hole 174 | through-hole 175 | through-hole 171 |
| Negative plate 402 | through-hole 175 | through-hole 171 | through-hole 176 | through-hole 174 |
| First neutral plate 403 | through-hole 174 | through-hole 176 | through-hole 171 | through-hole 175 |
| Second neutral plate 404 | through-hole 171 | through-hole 175 | through-hole 174 | through-hole 176 |
| Membrane 354 | through-hole 476 | through-hole 474 | through-hole 475 | through-hole 471 |

Table A above also lists which of the through-holes 470 (see FIG. 22) of the membrane 354 (see FIG. 22) is positioned inside each of the first and second sealed regions 420 and 422 when the seal 352 is positioned alongside the membrane 354 in the first and second orientations. For example, when the seal 352 is positioned alongside the membrane 354 (see FIG. 22) in the first orientation, the through-holes 476 and 474 are positioned inside the first and second sealed regions 420 and 422, respectively. On the other hand, when the seal 352 is positioned alongside the membrane 354 (see FIG. 22) in the second orientation, the through-holes 475 and 471 are positioned inside the first and second sealed regions 420 and 422, respectively.

FIG. 23 illustrates an exemplary slice 430 through the cell 350, which is also illustrated in FIGS. 16 and 24. Referring to FIG. 23, the slice 430 includes the first end cap 146, the second end cap 148, the plates 142, the seals 352, and the membranes 354 (see FIG. 22). In this embodiment, the plates 142 include positive plates 401A and 401B, the negative plate 402, first neutral plates 403A-403D, second neutral plates 404A-404C. The positive plates 401A and 401B are each like the positive plate 401 (see FIG. 17). The first neutral plates 403A-403D are each like the first neutral plate 403 (see FIG. 19). The second neutral plates 404A-404C are each like the second neutral plate 404 (see FIG. 20). The seals 352 include seals 352A-352Q and the membranes 354 (see FIG. 22) include membranes 354A-354F. In the embodiment illustrated, the first end cap 146, the second end cap 148, the plates 142, the seals 352, and the membranes 354 (see FIG. 22) are arranged in the following order:

1. the first end cap 146;
2. the seal 352A (in the first orientation);
3. the positive plate 401A;
4. the seal 352B (in the first orientation);
5. the second neutral plate 404A;
6. the seal 352C (in the second orientation);
7. the membrane 354A;
8. the seal 352D (in the first orientation);
9. the first neutral plate 403A;
10. the seal 352E (in the second orientation);
11. the membrane 354B;
12. the seal 352F (in the first orientation);
13. the second neutral plate 404B;
14. the seal 352G (in the second orientation);
15. the membrane 354C;
16. the seal 352H (in the first orientation);
17. the first neutral plate 403B;
18. the seal 352I (in the second orientation);
19. the negative plate 402;
20. the seal 352J (in the first orientation);
21. the membrane 354D;
22. the seal 352K (in the second orientation);
23. the first neutral plate 403C;
24. the seal 352L (in the first orientation);
25. the membrane 354E;
26. the seal 352M (in the second orientation);
27. the second neutral plate 404C;
28. the seal 352N (in the first orientation);
29. the membrane 354F;
30. the seal 352O (in the second orientation);
31. the first neutral plate 403D;
32. the seal 352P (in the first orientation);
33. the positive plate 401B;
34. the seal 352Q (in the first orientation); and
35. the second end cap 148

As shown in FIG. 24, the seals 352A-352Q define a first gas chamber 432 (shown using hash marks) and a second gas chamber 434 in the cell 350. The first and second gas chambers 432 and 434 are isolated from one another. The first gas chamber 432 (shown using hash marks) may temporarily house the oxygen gas 121 (see FIG. 2) and conduct it to the oxygen outlet 362. The second gas chamber 434 may temporarily house the hydrogen gas 120 (see FIG. 2) and conduct it to the hydrogen outlet 244. As shown in FIG. 23, one side of each of the negative plate 402, the first neutral plates 403A-403D, the second neutral plates 404A-404C, and the membranes 354A-354F is positioned in the first gas chamber 432 (see FIG. 24) and the other side of each of these structures is positioned in the second gas chamber 434 (see FIG. 24).

As explained above and shown in FIG. 24, the seals 352A-352Q cause the water 116 (see FIGS. 1-3) and the oxygen gas 121 (see FIG. 2) to zigzag through the first gas chamber 432 and the water 116 and the hydrogen gas 120 (see FIG. 2) to zig-zag through the second gas chamber 434. Thus, fewer ones of the through-holes 170 (see FIGS. 6-10, 12-15, and 17-20) are needed to create the desired flows. As mentioned above, the cell 350 may include more than one water inlet like the water inlet 240 (see FIGS. 4A and 4B). In such embodiments, at least one of the water inlets may open into the first gas chamber 432 and at least one of the water inlets may open into the second gas chamber 434.

Referring to FIG. 21, the seals 352 may be constructed from any material suitable for constructing the seals 144 (see FIGS. 4A, 5, and 11). In alternate embodiments, the seals 144 may be used with the plates 401-404. In such embodiments, additional seals (e.g., O-rings) may be used to block or isolate at least two of the through-holes 170 of the plates 401-404 as described above.

Power Controller

FIG. 25 illustrates an exemplary implementation of the power controller 108 connected to the hydrogen generator 106 by the electrical conductors 110. As mentioned above, the power controller 108 may be connected to the power source 109 (see FIG. 1), which may be implemented as an AC source (e.g., a conventional wall socket). Thus, the power controller 108 has positive and negative contacts 502 and 504 configured to be connected to the power source 109 (see FIG. 1). By way of a non-limiting example, the positive and negative contacts 502 and 504 may be components of a conventional plug configured to plug into a conventional (110 V) AC wall outlet. The AC is conducted to a rectifier 510 that converts the AC to DC. Conductors 512 and 514 conduct the DC to the positive and negative terminals T+ and T−, respectively.

In the embodiment illustrated, the negative contact 504 is connected to the rectifier 510 by a conductor 516. The positive contact 502 is connected by a conductor 518 to a solid-state relay 520. The solid-state relay 520 is connected to the rectifier 510 by a conductor 522. The solid-state relay 520 includes a potentiometer 530 that is used to determine the voltage of the AC input into the rectifier 510. The potentiometer 530 is connected to an interface 532 that may be operated manually (e.g., a dial) or by a computing device (not shown). The interface 532 controls the potentiometer 530 and determines the voltage of the AC input into the rectifier 510. The voltage of the DC output by the rectifier 510 depends upon the voltage of the AC input into the rectifier 510. Thus, by controlling the voltage of the AC input into the rectifier 510, the potentiometer 530 determines the voltage of the DC output by the rectifier 510.

The voltage of the DC output by the rectifier 510 determines at least in part the amount of hydrogen gas output by the hydrogen generator 106.

Hydrogen Consuming Process and/or Device

Referring to FIG. 1, the hydrogen consuming process and/or device 134 may be any process or device configured to use or consume the hydrogen gas 120 (see FIG. 2). Optionally, the hydrogen consuming process and/or device 134 may use or consume the oxygen gas 121 (see FIG. 2) with the hydrogen gas 120 (see FIG. 2).

The hydrogen consuming process and/or device 134 may be implemented as a hydrogenation process. By way of another non-limiting example, the hydrogen consuming process and/or device 134 may be any device configured to produce an explosion. For example, the hydrogen consuming process and/or device 134 may be implemented as an internal combustion engine (e.g., a diesel engine or a gasoline engine). Such an internal combustion engine may be incorporated into a vehicle (e.g., a car, a truck, a motorcycle, a tractor, a bus, a semi-trailer truck, a boat, an airplane, a train, etc.). By way of yet another non-limiting example, the hydrogen consuming process and/or device 134 may be any device configured to produce a flame used to produce heat and/or light. For example, the hydrogen consuming process and/or device 134 may be implemented as an oven, an industrial oven (e.g., configured to melt steel, glass, aluminum, etc.), an electric generator, a heating unit (e.g., used for residential and/or commercial heating), a stove, and the like.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

The invention claimed is:

1. A hydrogen generator for use with a water source and an electrical power source, the hydrogen generator comprising:

a plurality of plates each having a plurality of through-holes formed therein, each of the plurality of plates being electrically conductive, each of the plurality of plates having first, second, third, and fourth edges, the first and third edges being parallel with one another, the second and fourth edges being parallel with one another, the plurality of plates comprising a first positive plate, a first negative plate, a first neutral plate, and a second neutral plate, the first positive plate being configured to be connected to a positive terminal of the electrical power source, the first negative plate being configured to be connected to a negative terminal of the electrical power source, the plurality of plates being arranged in a series with the first and second neutral plates being positioned between the first positive plate and the first negative plate, interstitial spaces being defined between adjacent ones of the plurality of plates in the series, the plurality of through-holes formed in each of the plurality of plates comprising first, second, third, fourth, and fifth through-holes, the first, second, third, and fourth through-holes being arranged in a linear series positioned closer to the third edge than the first edge, the linear series being parallel with the third edge, the fifth through-hole being positioned closer to the first edge than the third edge, and the fifth through-hole being positioned closer to the fourth edge than the second edge;

a plurality of seals each being positioned within a corresponding one of the interstitial spaces, each of the plurality of seals defining an interior space that is closed along a peripheral portion of the seal within the corresponding interstitial space and open along the adjacent plates defining the corresponding interstitial space, for each of the plurality of seals, the plurality of through-holes formed in each of the adjacent plates defining the interstitial space corresponding to the seal being in communication with the interior space defined by the seal to thereby form a sealed chamber that extends through the series, each of the plurality of seals being electrically non-conductive;

a water inlet configured to allow water from the water source into the sealed chamber, the water electrically connecting the first positive plate to the first negative plate, which causes the water to split into oxygen and hydrogen; and a hydrogen outlet configured to allow the hydrogen to exit from the sealed chamber.

2. The hydrogen generator of claim 1, wherein
the second neutral plate is positioned between the first neutral plate and the first negative plate,
the plurality of plates each have a plurality of lines formed thereupon,
the plurality of lines formed on the first positive plate defines a positive pattern,
the plurality of lines formed on the first negative plate defines a negative pattern,
the plurality of lines formed on the first neutral plate defines a first neutral pattern,
the plurality of lines formed on the second neutral plate defines a second neutral pattern, and
the positive pattern, the negative pattern, the first neutral pattern, and the second neutral pattern are different from one another.

3. The hydrogen generator of claim 2, wherein each of the plurality of plates has a first side opposite a second side,
the positive pattern is formed on the first side of the first positive plate, the negative pattern is formed on the second side of the first negative plate,
the first neutral pattern is formed on the first side of the first neutral plate,
the second neutral pattern is formed on the second side of the second neutral plate, and
the positive pattern, the negative pattern, the first neutral pattern, and the second neutral pattern all face in a common direction.

4. The hydrogen generator of claim 3, wherein each of the plurality of plates has an upright orientation and a corner is defined as an intersection of the first and fourth edges
the corner of the first positive plate is positioned in a first upper position,
the corner of the first negative plate is positioned in a second upper position,
the corner of the first neutral plate is positioned in a first lower position, and
the corner of the second neutral plate is positioned in a second lower position.

5. The hydrogen generator of claim 4, wherein the positive and negative patterns encourage flow toward the fifth through-hole, and
the first and second neutral patterns encourage flow toward the first, second, third, and fourth through-holes.

6. The hydrogen generator of claim 5, wherein the positive and negative patterns each include first, second, third, fourth lines that extend from the first, second, third, and fourth through-holes, respectively, to the fifth through-hole, and
the first and second neutral patterns each include fifth, sixth, seventh, eighth, ninth, and tenth lines, the ninth and tenth lines are connected together at an intersection point, the tenth line extends from the intersection point to the fifth through-hole, the fifth, sixth, seventh, and eighth lines extend from the first, second, third, and fourth through-holes, respectively, to at least one of the ninth or tenth lines.

7. The hydrogen generator of claim 1, wherein the plurality of plates comprises third and fourth neutral plates,
the plurality of plates each have a plurality of lines formed thereupon,
the plurality of lines formed on the first positive plate defines a positive pattern,
the plurality of lines formed on the first negative plate defines a negative pattern,
the plurality of lines formed on the first neutral plate defines a first neutral pattern,
the plurality of lines formed on the second neutral plate defines a second neutral pattern,
the positive pattern, the negative pattern, the first neutral pattern, and the second neutral pattern are different from one another,
the first neutral plate is positioned between the first positive plate and the second neutral plate,
the third neutral plate is positioned between the second neutral plate and the fourth neutral plate,
the fourth neutral plate is positioned between the third neutral plate and the first negative plate,
the plurality of lines formed on the third neutral plate define the first neutral pattern, and
the plurality of lines formed on the fourth neutral plate define the second neutral pattern.

8. The hydrogen generator of claim 7, wherein together, the first, second, third, and fourth neutral plates are a first series of neutral plates, the plurality of plates comprise a second positive plate, a second negative plate, a second series of neutral plates like the first series of neutral plates, and a third series of neutral plates like the first series of neutral plates, the second series of neutral plates is positioned between the first negative plate and the second positive plate, and the third series of neutral plates is positioned between the second positive plate and the second negative plate.

9. The hydrogen generator of claim 8, further comprising:
a positive conductor connected to the positive terminal, the first positive plate, and the second positive plate; and
a negative conductor connected to the negative terminal, the first negative plate, and the second negative plate.

10. The hydrogen generator of claim 8, further comprising:
a first end cap comprising the water inlet;
first and second end seals each like one of the plurality of seals, the first end seal being positioned between the first end cap and the first positive plate; and
a second end cap comprising the hydrogen outlet, the second end seal being positioned between the second end cap and the second negative plate.

11. The hydrogen generator of claim 10, further comprising:
a plurality of ties connecting the first and second end caps together, the plurality of ties passing alongside the series of the plurality of plates, each of the plurality of plates comprising at least one edge with cutouts formed therein, each of the cutouts being configured to receive a portion of one of the plurality of ties.

12. The hydrogen generator of claim 1, wherein the water comprises a catalyst.

13. The hydrogen generator of claim 12, wherein the catalyst is potassium hydroxide.

14. The hydrogen generator of claim 1, wherein each of the first, second, third, fourth, and fifth through-holes has a diameter from 1 millimeter to 2 millimeters.

15. A hydrogen generator for use with a water source and an electrical power source, the hydrogen generator comprising:
an electrolysis chamber having a water inlet and a hydrogen outlet, the water inlet being configured to receive water from the water source, the hydrogen outlet being configured to allow hydrogen generated inside the electrolysis chamber to exit therefrom; and
a series of parallel plates positioned in the electrolysis chamber and configured to generate the hydrogen, the series of parallel plates comprising sets of plates, each of the sets comprising first and second neutral plates positioned in between a positive plate and a negative plate, positive plate of each of the sets being configured to be connected to a positive terminal of the electrical power source, the negative plate of each of the sets being configured to be connected to a negative terminal of the electrical power source, the water inside the electrolysis chamber forming an electrical connection between the positive and negative plates of each of the sets that splits the water into the hydrogen and oxygen, each plate in the series of parallel plates comprising through-holes configured to allow the water and the hydrogen to flow therethrough, the positive plate of each of the sets having a positive pattern of lines formed thereon, the negative plate of each of the sets having a negative pattern of lines formed thereon, the first neutral plate of each of the sets having a first neutral pattern of lines formed thereon, the second neutral plate of each of the sets having a second neutral pattern of lines formed thereon, and the positive pattern of lines, the negative pattern of lines, the first neutral pattern of lines, and the second neutral pattern of lines being different from one another.

16. The hydrogen generator of claim 15, wherein the electrolysis chamber is at least partially defined within a plurality of seals positioned one each between each adjacent pair of plates within the series of parallel plates.

17. The hydrogen generator of claim 16, further comprising:
first and second end caps flanking the series of parallel plates;
a first end cap seal positioned between the first end cap and the series of parallel plates; and
a second end cap seal positioned between the second end cap and the series of parallel plates, the electrolysis chamber extending from the first end cap to the second end cap.

18. The hydrogen generator of claim 17, wherein the water inlet is formed in the first end cap, and
the hydrogen outlet is formed in the second end cap.

19. The hydrogen generator of claim 15, wherein for each of the sets, the first and second neutral plates of the set are configured to provide a desired amount of electrical resistance between the positive and negative plates of the set.

20. The hydrogen generator of claim 15, wherein the water comprises a catalyst.

21. The hydrogen generator of claim 20, wherein the catalyst is potassium hydroxide.

22. The hydrogen generator of claim 15, wherein the positive plate of each of the sets has a first pattern of through-holes formed therein,
the negative plate of each of the sets has a second pattern of through-holes formed therein,
the first neutral plate of each of the sets has a third pattern of through-holes formed therein,
the second neutral plate of each of the sets has a fourth pattern of through-holes formed therein,
the first and second patterns are mirror images of one another; and
the third and fourth patterns are mirror images of one another.

23. The hydrogen generator of claim 22, wherein the through-holes of the first, second, third, and fourth patterns each have a diameter from 1 millimeter to 2 millimeters.

24. A hydrogen generator comprising:
a plurality of seals each comprising a peripheral portion that defines an interior space; and
a series of parallel plates with one of the plurality of seals positioned between each adjacent pair of parallel plates in the series of parallel plates, each plate in the series of parallel plates comprising a plurality of through-holes that interconnect the interior space of each of the plurality of seals, the plurality of through-holes comprising first, second, third, fourth, and fifth through-holes, the series of parallel plates comprising sets of plates, each of the sets comprising first and second neutral plates positioned in between a positive plate and a negative plate, the series of parallel plates splitting the water into hydrogen and oxygen when the positive plate of each of the sets is connected to a positive terminal of an electrical power source and the negative plate of each of the sets is connected to a negative terminal of the electrical power source, each plate in the series of parallel plates having first, second, third, and fourth edges, the first and third edges being parallel with one another, the second and fourth edges being parallel with one another, the first, second, third, and fourth through-holes being arranged in a linear series positioned closer to the third edge than the first edge, the linear series being parallel with the third edge, the fifth through-hole being positioned closer to the first edge than the third edge, and the fifth through-hole being positioned closer to the fourth edge than the second edge.

25. The hydrogen generator of claim 24, wherein in each of the sets, the second neutral plate is positioned between the first neutral plate and the negative plate,
   each plate in the series of parallel plates has a plurality of lines formed thereupon,
   the plurality of lines formed on the positive plate of each of the sets defines a positive pattern,
   the plurality of lines formed on the negative plate of each of the sets defines a negative pattern,
   the plurality of lines formed on the first neutral plate of each of the sets defines a first neutral pattern,
   the plurality of lines formed on the second neutral plate of each of the sets defines a second neutral pattern, and
   the positive pattern, the negative pattern, the first neutral pattern, and the second neutral pattern are different from one another.

26. The hydrogen generator of claim 25, wherein each plate in the series of parallel plates has a first side opposite a second side,
   the positive pattern is formed on the first side of the positive plate of each of the sets,
   the negative pattern is formed on the second side of the negative plate of each of the sets,
   the first neutral pattern is formed on the first side of the first neutral plate of each of the sets,
   the second neutral pattern is formed on the second side of the second neutral plate of each of the sets, and
   the positive pattern, the negative pattern, the first neutral pattern, and the second neutral pattern all face in a common direction.

27. The hydrogen generator of claim 26, wherein each of the plurality of plates has an upright orientation and a corner is defined as an intersection of the first and fourth edges
   the corner of the positive plate of each of the sets is positioned in a first upper position,
   the corner of the negative plate of each of the sets is positioned in a second upper position,
   the corner of the first neutral plate of each of the sets is positioned in a first lower position, and
   the corner of the second neutral plate of each of the sets is positioned in a second lower position.

28. The hydrogen generator of claim 27, wherein the positive and negative patterns each include first, second, third, fourth lines that extend from the first, second, third, and fourth through-holes, respectively, to the fifth through-hole, and
   the first and second neutral patterns each include fifth, sixth, seventh, eighth, ninth, and tenth lines, the ninth and tenth lines are connected together at an intersection point, the tenth line extends from the intersection point to the fifth through-hole, the fifth, sixth, seventh, and eighth lines extend from the first, second, third, and fourth through-holes, respectively, to at least one of the ninth or tenth lines.

29. The hydrogen generator of claim 24, wherein each of the sets comprises third and fourth neutral plates, each plate in the series of parallel plates has a plurality of lines formed thereupon,
   the plurality of lines formed on the positive plate of each of the sets defines a positive pattern,
   the plurality of lines formed on the negative plate of each of the sets defines a negative pattern,
   the plurality of lines formed on the first neutral plate of each of the sets defines a first neutral pattern,
   the plurality of lines formed on the second neutral plate of each of the sets defines a second neutral pattern,
   the positive pattern, the negative pattern, the first neutral pattern, and the second neutral pattern are different from one another,
   in each of the sets, the first neutral plate is positioned between the positive plate and the second neutral plate,
   in each of the sets, the third neutral plate is positioned between the second neutral plate and the fourth neutral plate,
   in each of the sets, the fourth neutral plate is positioned between the third neutral plate and the negative plate,
   the plurality of lines formed on the third neutral plate of each of the sets define the first neutral pattern, and
   the plurality of lines formed on the fourth neutral plate of each of the sets define the second neutral pattern.

30. The hydrogen generator of claim 24, further comprising:
   a first end cap comprising a water inlet;
   first and second end seals each like one of the plurality of seals, the first end seal being positioned between the first end cap and a first plate in the series of parallel plates; and
   a second end cap comprising a hydrogen outlet, the second end seal being positioned between the second end cap and a last plate in the series of parallel plates.

31. The hydrogen generator of claim 30, further comprising:
   a plurality of ties connecting the first and second end caps together, the plurality of ties passing alongside the series of parallel plates.

32. The hydrogen generator of claim 24, wherein the water comprises a catalyst.

33. The hydrogen generator of claim 32, wherein the catalyst is potassium hydroxide.

34. A hydrogen generator for use with a water source and an electrical power source, the hydrogen generator comprising:
   a plurality of plates each having a plurality of through-holes formed therein, each of the plurality of plates being electrically conductive, the plurality of plates comprising a first positive plate, a first negative plate, a first neutral plate, a second neutral plate, a third neutral plate, and a fourth neutral plate, the first positive plate being configured to be connected to a positive terminal of the electrical power source, the first negative plate being configured to be connected to a negative terminal of the electrical power source, the plurality of plates being arranged in a series with the first, second, third, and fourth neutral plates being positioned between the first positive plate and the first negative plate, the first neutral plate being positioned between the first positive plate and the second neutral plate, the third neutral plate being positioned between the second neutral plate and the fourth neutral plate, the fourth neutral plate being positioned between the third neutral plate and the first negative plate, interstitial spaces being defined between adjacent ones of the plurality of plates in the series, the plurality of plates each having a plurality of lines formed thereupon, the plurality of lines formed on the first positive plate defining a positive pattern, the plurality of lines formed on the first negative plate defining a negative pattern, the plurality of lines formed on the first neutral plate defining a first neutral pattern, the plurality of lines formed on the second neutral plate defining a second neutral pattern, the positive pattern, the negative pattern, the first neutral pattern, and the second neutral pattern being different from one another, the plurality of lines formed on the third neutral plate defining the first neutral pattern, the plurality of lines formed on the fourth neutral plate defining the second neutral pattern, together, the first, second, third, and fourth neutral plates being a first series of neutral plates;

a plurality of seals each being positioned within a corresponding one of the interstitial spaces, each of the plurality of seals defining an interior space that is closed along a peripheral portion of the seal within the corresponding interstitial space and open along the adjacent plates defining the corresponding interstitial space, for each of the plurality of seals, the plurality of through-holes formed in each of the adjacent plates defining the interstitial space corresponding to the seal being in communication with the interior space defined by the seal to thereby form a sealed chamber that extends through the series, each of the plurality of seals being electrically non-conductive;

a water inlet configured to allow water from the water source into the sealed chamber, the water electrically connecting the first positive plate to the first negative plate, which causes the water to split into oxygen and hydrogen; and a hydrogen outlet configured to allow the hydrogen to exit from the sealed chamber.

35. The hydrogen generator of claim 34, wherein each of the plurality of plates has a first side opposite a second side,
the positive pattern is formed on the first side of the first positive plate,
the negative pattern is formed on the second side of the first negative plate,
the first neutral pattern is formed on the first side of the first neutral plate,
the second neutral pattern is formed on the second side of the second neutral plate, and
the positive pattern, the negative pattern, the first neutral pattern, and the second neutral pattern all face in a common direction.

36. The hydrogen generator of claim 35, wherein each of the plurality of plates has first, second, third, and fourth edges, the first and third edges are parallel with one another, the second and fourth edges are parallel with one another, each of the plurality of plates has an upright orientation, a corner is defined as an intersection of the first and fourth edges
the corner of the first positive plate is positioned in a first upper position,
the corner of the first negative plate is positioned in a second upper position,
the corner of the first neutral plate is positioned in a first lower position, and
the corner of the second neutral plate is positioned in a second lower position.

37. The hydrogen generator of claim 36, wherein the plurality of through-holes formed in each of the plurality of plates comprise first, second, third, fourth, and fifth through-holes, the positive and negative patterns encourage the hydrogen created to flow toward the fifth through-hole, and
the first and second neutral patterns encourage the hydrogen created to flow toward the first, second, third, and fourth through-holes.

38. The hydrogen generator of claim 37, wherein the positive and negative patterns each include first, second, third, fourth lines that extend from the first, second, third, and fourth through-holes, respectively, to the fifth through-hole, and
the first and second neutral patterns each include fifth, sixth, seventh, eighth, ninth, and tenth lines, the ninth and tenth lines are connected together at an intersection point, the tenth line extends from the intersection point to the fifth through-hole, the fifth, sixth, seventh, and eighth lines extend from the first, second, third, and fourth through-holes, respectively, to at least one of the ninth or tenth lines.

39. The hydrogen generator of claim 34, wherein the plurality of plates comprise a second positive plate, a second negative plate, a second series of neutral plates like the first series of neutral plates, and a third series of neutral plates like the first series of neutral plates,
the second series of neutral plates is positioned between the first negative plate and the second positive plate, and
the third series of neutral plates is positioned between the second positive plate and the second negative plate.

40. The hydrogen generator of claim 39, further comprising:
a positive conductor connected to the positive terminal, the first positive plate, and the second positive plate; and
a negative conductor connected to the negative terminal, the first negative plate, and the second negative plate.

41. The hydrogen generator of claim 39, further comprising:
a first end cap comprising the water inlet;
first and second end seals each like one of the plurality of seals, the first end seal being positioned between the first end cap and the first positive plate; and
a second end cap comprising the hydrogen outlet, the second end seal being positioned between the second end cap and the second negative plate.

42. The hydrogen generator of claim 41, further comprising:
a plurality of ties connecting the first and second end caps together, the plurality of ties passing alongside the series of the plurality of plates, each of the plurality of plates comprising at least one edge with cutouts formed therein, each of the cutouts being configured to receive a portion of one of the plurality of ties.

43. The hydrogen generator of claim 34, wherein the water comprises a catalyst.

44. The hydrogen generator of claim 43, wherein the catalyst is potassium hydroxide.

45. The hydrogen generator of claim 34, wherein the first positive plate has a first pattern of through-holes formed therein,
the first negative plate has a second pattern of through-holes formed therein,
the first neutral plate has a third pattern of through-holes formed therein,
the second neutral plate has a fourth pattern of through-holes formed therein,
the first and second patterns are mirror images of one another; and the third and fourth patterns are mirror images of one another.

46. The hydrogen generator of claim 45, wherein the through-holes of the first, second, third, and fourth patterns each have a diameter from 1 millimeter to 2 millimeters.

47. A hydrogen generator for use with a water source and an electrical power source, the hydrogen generator comprising:
  a plurality of plates each having a plurality of through-holes formed therein, each of the plurality of plates being electrically conductive, the plurality of plates comprising a first positive plate, a first negative plate, a first neutral plate, and a second neutral plate, the first positive plate having a first pattern of through-holes formed therein, the first negative plate having a second pattern of through-holes formed therein, the first neutral plate having a third pattern of through-holes formed therein, the second neutral plate having a fourth pattern of through-holes formed therein, the first and second patterns being mirror images of one another, and the third and fourth patterns being mirror images of one another, the first positive plate being configured to be connected to a positive terminal of the electrical power source, the first negative plate being configured to be connected to a negative terminal of the electrical power source, the plurality of plates being arranged in a series with the first and second neutral plates being positioned between the first positive plate and the first negative plate, the second neutral plate being positioned between the first neutral plate and the first negative plate, interstitial spaces being defined between adjacent ones of the plurality of plates in the series;
  a plurality of seals each being positioned within a corresponding one of the interstitial spaces, each of the plurality of seals defining an interior space that is closed along a peripheral portion of the seal within the corresponding interstitial space and open along the adjacent plates defining the corresponding interstitial space, for each of the plurality of seals, the plurality of through-holes formed in each of the adjacent plates defining the interstitial space corresponding to the seal being in communication with the interior space defined by the seal to thereby form a sealed chamber that extends through the series, each of the plurality of seals being electrically non-conductive;
  a water inlet configured to allow water from the water source into the sealed chamber, the water electrically connecting the first positive plate to the first negative plate, which causes the water to split into oxygen and hydrogen; and
  a hydrogen outlet configured to allow the hydrogen to exit from the sealed chamber.

48. The hydrogen generator of claim 47, wherein the plurality of through-holes formed in each of the plurality of plates comprise first, second, third, fourth, and fifth through-holes,
  each of the plurality of plates has first, second, third, and fourth edges,
  the first and third edges are parallel with one another,
  the second and fourth edges are parallel with one another,
  the first, second, third, and fourth through-holes are arranged in a linear series positioned closer to the third edge than the first edge,
  the linear series is parallel with the third edge,
  the fifth through-hole is positioned closer to the first edge than the third edge,
  the fifth through-hole is positioned closer to the fourth edge than the second edge,
  the plurality of plates each have a plurality of lines formed thereupon,
  the plurality of lines formed on the first positive plate defines a positive pattern,
  the plurality of lines formed on the first negative plate defines a negative pattern,
  the plurality of lines formed on the first neutral plate defines a first neutral pattern,
  the plurality of lines formed on the second neutral plate defines a second neutral pattern, and
  the positive pattern, the negative pattern, the first neutral pattern, and the second neutral pattern are different from one another.

49. The hydrogen generator of claim 48, wherein each of the plurality of plates has a first side opposite a second side,
  the positive pattern is formed on the first side of the first positive plate,
  the negative pattern is formed on the second side of the first negative plate,
  the first neutral pattern is formed on the first side of the first neutral plate,
  the second neutral pattern is formed on the second side of the second neutral plate, and
  the positive pattern, the negative pattern, the first neutral pattern, and the second neutral pattern all face in a common direction.

50. The hydrogen generator of claim 49, wherein each of the plurality of plates has an upright orientation and a corner is defined as an intersection of the first and fourth edges
  the corner of the first positive plate is positioned in a first upper position,
  the corner of the first negative plate is positioned in a second upper position,
  the corner of the first neutral plate is positioned in a first lower position, and
  the corner of the second neutral plate is positioned in a second lower position.

51. The hydrogen generator of claim 50, wherein the positive and negative patterns encourage the hydrogen created to flow toward the fifth through-hole, and
  the first and second neutral patterns encourage the hydrogen created to flow toward the first, second, third, and fourth through-holes.

52. The hydrogen generator of claim 51, wherein the positive and negative patterns each include first, second, third, fourth lines that extend from the first, second, third, and fourth through-holes, respectively, to the fifth through-hole, and
  the first and second neutral patterns each include fifth, sixth, seventh, eighth, ninth, and tenth lines, the ninth and tenth lines are connected together at an intersection point, the tenth line extends from the intersection point to the fifth through-hole, the fifth, sixth, seventh, and eighth lines extend from the first, second, third, and fourth through-holes, respectively, to at least one of the ninth or tenth lines.

53. The hydrogen generator of claim 47, wherein the plurality of plates comprises third and fourth neutral plates,
  the plurality of plates each have a plurality of lines formed thereupon,
  the plurality of lines formed on the first positive plate defines a positive pattern,
  the plurality of lines formed on the first negative plate defines a negative pattern, the plurality of lines formed on the first neutral plate defines a first neutral pattern, the plurality of lines formed on the second neutral plate defines a second neutral pattern, the positive pattern, the negative pattern, the first neutral pattern, and the second neutral pattern are different from one another, the first neutral plate is positioned between the first positive plate and the second neutral plate, the third neutral plate is positioned between the second neutral plate and the fourth neutral plate, the fourth neutral plate is positioned between the third neutral plate and the first negative plate, the plurality of lines formed on the third neutral plate define the first neutral pattern, the plurality of lines formed on the fourth neutral plate define the second neutral pattern, together, the first, second, third, and fourth neutral plates are a first series of neutral plates, the plurality of plates comprise a second positive plate, a second negative plate, a second series of neutral plates like the first series of neutral plates, and a third series of neutral plates like the first series of neutral plates, the second series of neutral plates is positioned between the first negative plate and the second positive plate, and the third series of neutral plates is positioned between the second positive plate and the second negative plate.

54. The hydrogen generator of claim 53, further comprising:
a positive conductor connected to the positive terminal, the first positive plate, and the second positive plate; and
a negative conductor connected to the negative terminal, the first negative plate, and the second negative plate.

55. The hydrogen generator of claim 53, further comprising:
a first end cap comprising the water inlet;
first and second end seals each like one of the plurality of seals, the first end seal being positioned between the first end cap and the first positive plate; and
a second end cap comprising the hydrogen outlet, the second end seal being positioned between the second end cap and the second negative plate.

56. The hydrogen generator of claim 55, further comprising:
a plurality of ties connecting the first and second end caps together, the plurality of ties passing alongside the series of the plurality of plates, each of the plurality of plates comprising at least one edge with cutouts formed therein, each of the cutouts being configured to receive a portion of one of the plurality of ties.

57. The hydrogen generator of claim 47, wherein the water comprises a catalyst.

58. The hydrogen generator of claim 57, wherein the catalyst is potassium hydroxide.

59. The hydrogen generator of claim 47, wherein the through-holes of the first, second, third, and fourth patterns each have a diameter from 1 millimeter to 2 millimeters.

60. A hydrogen generator for use with a water source and an electrical power source, the hydrogen generator comprising:
an electrolysis chamber having a water inlet and a hydrogen outlet, the water inlet being configured to receive water from the water source, the hydrogen outlet being configured to allow hydrogen generated inside the electrolysis chamber to exit therefrom; and
a series of parallel plates positioned in the electrolysis chamber and configured to generate the hydrogen, the series of parallel plates comprising sets of plates, each of the sets comprising first and second neutral plates positioned in between a positive plate and a negative plate, positive plate of each of the sets being configured to be connected to a positive terminal of the electrical power source, the negative plate of each of the sets being configured to be connected to a negative terminal of the electrical power source, the water inside the electrolysis chamber forming an electrical connection between the positive and negative plates of each of the sets that splits the water into the hydrogen and oxygen, each plate in the series of parallel plates comprising through-holes configured to allow the water and the hydrogen to flow therethrough, the positive plate of each of the sets having a first pattern of through-holes formed therein, the negative plate of each of the sets having a second pattern of through-holes formed therein, the first neutral plate of each of the sets having a third pattern of through-holes formed therein, the second neutral plate of each of the sets having a fourth pattern of through-holes formed therein, the first and second patterns being mirror images of one another; and the third and fourth patterns being mirror images of one another.

61. The hydrogen generator of claim 60, wherein the electrolysis chamber is at least partially defined within a plurality of seals positioned one each between each adjacent pair of plates within the series of parallel plates.

62. The hydrogen generator of claim 61, further comprising:
first and second end caps flanking the series of parallel plates;
a first end cap seal positioned between the first end cap and the series of parallel plates; and
a second end cap seal positioned between the second end cap and the series of parallel plates, the electrolysis chamber extending from the first end cap to the second end cap.

63. The hydrogen generator of claim 62, wherein the water inlet is formed in the first end cap, and
the hydrogen outlet is formed in the second end cap.

64. The hydrogen generator of claim 60, wherein for each of the sets, the first and second neutral plates of the set are configured to provide a desired amount of electrical resistance between the positive and negative plates of the set.

65. The hydrogen generator of claim 60, wherein the water comprises a catalyst.

66. The hydrogen generator of claim 65, wherein the catalyst is potassium hydroxide.

67. The hydrogen generator of claim 66, wherein the through-holes of the first, second, third, and fourth patterns each have a diameter from 1 millimeter to 2 millimeters.

68. A hydrogen generator comprising:
a plurality of seals each comprising a peripheral portion that defines an interior space; and
a series of parallel plates with one of the plurality of seals positioned between each adjacent pair of parallel plates in the series of parallel plates, each plate in the series of parallel plates comprising a plurality of through-holes that interconnect the interior space of each of the plurality of seals, the series of parallel plates comprising sets of plates, each of the sets comprising first, second, third, and fourth neutral plates positioned in between a positive plate and a negative plate, the series of parallel plates splitting water into hydrogen and oxygen when the positive plate of each of the sets is connected to a positive terminal of an electrical power source and the negative plate of each of the sets is connected to a negative terminal of the electrical power source, each plate in the series of parallel plates having a plurality of lines formed thereupon, the plurality of lines formed on the positive plate of each of the sets defining a positive pattern, the plurality of lines formed on the negative plate of each of the sets defining a negative pattern, the plurality of lines formed on the first neutral plate of each of the sets defining a first neutral pattern, the plurality of lines formed on the second neutral plate of each of the sets defining a second neutral pattern, the positive pattern, the negative pattern, the first neutral pattern, and the second neutral pattern being different from one another, the first neutral plate being positioned between the positive plate and the second neutral plate in each of the sets, the third neutral plate being positioned between the second neutral plate and the fourth neutral plate in each of the sets, the fourth neutral plate being positioned between the third neutral plate and the negative plate in each of the sets, the plurality of lines formed on the third neutral plate of each of the sets defining the first neutral pattern, and the plurality of lines formed on the fourth neutral plate of each of the sets defining the second neutral pattern.

69. The hydrogen generator of claim 68, wherein each plate in the series of parallel plates has a first side opposite a second side,
the positive pattern is formed on the first side of the positive plate of each of the sets,
the negative pattern is formed on the second side of the negative plate of each of the sets,
the first neutral pattern is formed on the first side of the first neutral plate of each of the sets,
the second neutral pattern is formed on the second side of the second neutral plate of each of the sets, and
the positive pattern, the negative pattern, the first neutral pattern, and the second neutral pattern all face in a common direction.

70. The hydrogen generator of claim 69, wherein each plate in the series of parallel plates has first, second, third, and fourth edges, the first and third edges are parallel with one another, the second and fourth edges are parallel with one another, each of the plurality of plates has an upright orientation, a corner is defined as an intersection of the first and fourth edges
the corner of the positive plate of each of the sets is positioned in a first upper position,
the corner of the negative plate of each of the sets is positioned in a second upper position,
the corner of the first neutral plate of each of the sets is positioned in a first lower position, and
the corner of the second neutral plate of each of the sets is positioned in a second lower position.

71. The hydrogen generator of claim 70, wherein the plurality of through-holes comprise first, second, third, fourth, and fifth through-holes,
the positive and negative patterns each include first, second, third, fourth lines that extend from the first, second, third, and fourth through-holes, respectively, to the fifth through-hole, and
the first and second neutral patterns each include fifth, sixth, seventh, eighth, ninth, and tenth lines, the ninth and tenth lines are connected together at an intersection point, the tenth line extends from the intersection point to the fifth through-hole, the fifth, sixth, seventh, and eighth lines extend from the first, second, third, and fourth through-holes, respectively, to at least one of the ninth or tenth lines.

72. The hydrogen generator of claim 68, further comprising:
a first end cap comprising a water inlet;
first and second end seals each like one of the plurality of seals, the first end seal being positioned between the first end cap and a first plate in the series of parallel plates; and
a second end cap comprising a hydrogen outlet, the second end seal being positioned between the second end cap and a last plate in the series of parallel plates.

73. The hydrogen generator of claim 72, further comprising:
a plurality of ties connecting the first and second end caps together, the plurality of ties passing alongside the series of parallel plates.

74. The hydrogen generator of claim 68, wherein the water comprises a catalyst.

75. The hydrogen generator of claim 74, wherein the catalyst is potassium hydroxide.

* * * * *